(12) United States Patent
Takahashi et al.

(10) Patent No.: US 9,706,066 B2
(45) Date of Patent: Jul. 11, 2017

(54) IMAGE PROCESSING DEVICE, INFORMATION PROCESSING TERMINAL, AND RECORDING MEDIUM

(71) Applicant: Konica Minolta, Inc., Chiyoda-ku (JP)

(72) Inventors: Kazusei Takahashi, Nishinomiya (JP); Junichi Hase, Osaka (JP); Kenji Matsuhara, Kawanishi (JP); Kazuya Anezaki, Kobe (JP); Tomonari Yoshimura, Kyoto (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/164,871

(22) Filed: Jan. 27, 2014

(65) Prior Publication Data

US 2014/0218763 A1 Aug. 7, 2014

(30) Foreign Application Priority Data

Feb. 1, 2013 (JP) .................................. 2013-018184

(51) Int. Cl.
*G06F 3/12* (2006.01)
*G06F 15/173* (2006.01)
(Continued)

(52) U.S. Cl.
CPC ....... *H04N 1/00307* (2013.01); *G06F 3/1204* (2013.01); *G06F 3/1236* (2013.01);
(Continued)

(58) Field of Classification Search
None
See application file for complete search history.

(56) References Cited

U.S. PATENT DOCUMENTS 8,189,225 B1 * 5/2012 Lo et al. ...................... 358/1.15
2006/0061803 A1 * 3/2006 Oka .............................. 358/1.15
(Continued)

FOREIGN PATENT DOCUMENTS

JP 2008-033415 2/2008
JP 2009-098903 A 5/2009
(Continued)

OTHER PUBLICATIONS

Office Action dated Dec. 10, 2014, in corresponding Japanese Patent Application No. 2013-018184, and English translation thereof (6 pages).
(Continued)

*Primary Examiner* — Moustapha Diaby
(74) *Attorney, Agent, or Firm* — Buchanan Ingersoll & Rooney PC

(57) ABSTRACT

An image processing device capable of communicating with an information processing terminal and a cloud server. The image processing device comprises a communication controller to communicate with the information processing terminal, a server connecting unit to make connection to the cloud server based on connection information received from the information processing terminal and acquire an operational screen about a job from the cloud server, a remote screen generating unit to generate a remote screen based on the operational screen acquired by the server connecting unit and transmit the remote screen to the information processing terminal, the remote screen being used for remote control from the information processing terminal, and a job controller, if operational information received by the communication controller is an order made on the remote screen to execute a job, the job controller executing the job in cooperation with the cloud server.

20 Claims, 18 Drawing Sheets

(51) Int. Cl.
*G06K 15/00* (2006.01)
*H04N 1/00* (2006.01)

(52) U.S. Cl.
CPC .......... *G06F 3/1247* (2013.01); *G06F 3/1288* (2013.01); *G06F 3/1292* (2013.01); *H04N 1/00244* (2013.01); *H04N 2201/0075* (2013.01); *H04N 2201/0094* (2013.01); *Y02B 60/1271* (2013.01)

(56) References Cited

U.S. PATENT DOCUMENTS

| 2007/0109561 | A1* | 5/2007 | Suzue | H04N 1/00408 358/1.1 |
|---|---|---|---|---|
| 2009/0089423 | A1* | 4/2009 | Seki | G06F 15/16 709/224 |
| 2010/0131459 | A1* | 5/2010 | Todaka | 707/608 |
| 2011/0037865 | A1 | 2/2011 | Takagi et al. | |
| 2011/0199640 | A1* | 8/2011 | Shirai | G06F 3/1204 358/1.15 |
| 2011/0292445 | A1* | 12/2011 | Kato | G06F 3/1222 358/1.15 |
| 2012/0026526 | A1* | 2/2012 | Sekine | 358/1.13 |
| 2012/0262749 | A1 | 10/2012 | Yamamoto | |
| 2014/0244629 | A1* | 8/2014 | Huang | G06F 17/3053 707/723 |

FOREIGN PATENT DOCUMENTS

| JP | 2009-130493 A | 6/2009 |
|---|---|---|
| JP | 2011-041155 A | 2/2011 |
| JP | 2012-034277 A | 2/2012 |
| JP | 2012-222721 A | 11/2012 |

OTHER PUBLICATIONS

First Notice of the Opinion on Examination, issued in corresponding Chinese Patent Application No. 201410040991.6, dated Mar. 3, 2016, with English translation (25 pages).

* cited by examiner

IMAGE PROCESSING DEVICE 2

Fig. 15

WORKFLOW REGISTRATION DB  68

| KEYWORD | CONFIDENTIAL |
|---|---|
| FIRST JOB | WATERMARK ON EACH PAGE |
| SECOND JOB | CHANGE PASSWORD |
| THIRD JOB | STORE FILE INTO BOX FOR CONFIDENTIAL FILE |
| FOURTH JOB | ANNOUNCE BOX STORING FILE AND NEW PASSWORD |

68a
68b
68c
68d

IMAGE PROCESSING DEVICE 2

IMAGE PROCESSING DEVICE, INFORMATION PROCESSING TERMINAL, AND RECORDING MEDIUM

This application is based on the application No. 2013-018184 filed in Japan, the contents of which are hereby incorporated by reference.

BACKGROUND OF THE INVENTION

Field of the Invention

The present invention relates to an image processing device, an information processing terminal, and a recording medium. The present invention more specifically relates to a technique applied to use a cloud service provided by a cloud server by using an image processing device and an information processing terminal.

Description of the Background Art

An image processing device called for example an MFP (multi-function peripheral) having a printing function and a scanning function is generally used on a network. As an example, there has been a technique relating to such an image processing device that is known to allow editing of an operational screen displayed on an operational panel by remote control through a network (see Japanese Patent Application Laid-Open No. 2009-130493, for example). This conventional technique further allows a personal computer (PC) on the network to display the contents of screen information such as a Web page having been output to the personal computer from the image processing device.

Information processing terminals such as tablet terminals and smartphones have spread remarkably in recent years. These information processing terminals have the function of making connection to a network such as a LAN (local area network), a WAN (wide area network), or a public telephone network. Cloud servers have also spread in recent years that provide various cloud services through the Internet, for example. The cloud servers provide cloud services by executing various jobs. Examples of the jobs executed by the cloud servers include a job of storing data received through a network, a job of transmitting stored data to a different designated device, a job of converting data received through a network to a different data format and outputting the converted data, and a job of translating text data into a different language and outputting the translated data. Thus, a user in an environment that permits connection for example to the Internet can use a cloud service provided by a cloud server anytime and anywhere by connecting an information processing terminal to the cloud server and making the cloud server execute a job.

The user may connect the information processing terminal to the cloud server and use a service of translating text data composed of a large number of pages, for example. In this case, a long time (such as several tens of minutes or more) might elapse from when the user orders the cloud server to execute the translation job to when the job is completed. This conventionally forces the information processing terminal to be kept connected to the cloud server until the cloud server completes the translation job, making the information processing terminal less convenience.

If the user hopes to make a print output of the translated data after the cloud server completes the translation job, the user should log onto the cloud server from the image processing device again by directly operating an operational panel of the image processing device. Then, the user should select the translated data targeted for print output from various data stored in the cloud server and download the selected data. This causes a problem of bad operability. A problem of bad operability is also caused due to detailed setting operation for the print output that should be performed independently after the download.

SUMMARY OF THE INVENTION

In order to overcome the aforementioned problems, it is an object of the present invention to provide an image processing device, an information processing terminal, and a recording medium. According to the image processing device, the information processing terminal, and the recording medium, while connection is made between the information processing terminal and a cloud server and the information processing terminal and the cloud server communicate with each other directly, the connection is transferred to the image processing device. Then, the image processing device is remote controlled from the information processing terminal to allow the image processing device and the cloud server to work cooperatively to execute a job.

In order to achieve this object, the present invention is first intended for an image processing device capable of communicating with an information processing terminal and a cloud server. According to one aspect of this invention, the image processing device includes: a communication controller to communicate with the information processing terminal; a server connecting unit to make connection to the cloud server based on connection information received from the information processing terminal connected to the cloud server and acquire an operational screen from the cloud server, the operational screen being the same as an operational screen about a job displayed on the information processing terminal; a remote screen generating unit to generate a remote screen based on the operational screen acquired by the server connecting unit from the cloud server and transmit the remote screen to the information processing terminal through the communication controller, the remote screen being used for remote control from the information processing terminal; and a job controller. If operational information received by the communication controller is an order made on the remote screen to execute a job, the job controller executes the job in cooperation with the cloud server.

Second, the present invention is intended for an information processing terminal capable of communicating with an image processing device and a cloud server. According to one aspect of this invention, the information processing terminal includes: a display unit to present various information; an operational unit to detect various operations by a user; a server connecting unit to make connection to the cloud server based on operation detected by the operational unit, acquire an operational screen about a job from the cloud server, and display the operational screen on the display unit; and a remote screen controller. While the server connecting unit makes connection to the cloud server, the remote screen controller transmits to the image processing device connection information indicating connection to the cloud server, acquires from the image processing device a remote screen corresponding to the operational screen about the job and switches a screen on the display unit to the remote screen, and transmits operational information to the image processing device in response to detection of operation on the remote screen.

Third, the present invention is intended for a computer-readable recording medium storing a program to be executed by an information processing terminal capable of communicating with an image processing device and a cloud server.

The information processing terminal includes a display unit to present various information and an operational unit to detect various operations made by a user. According to one aspect of this invention intended for the recording medium, while the information processing terminal makes connection to the cloud server based on operation detected by the operational unit and an operational screen about a job acquired from the cloud server is displayed on the display unit, the program is executed by the information processing terminal to make the information processing terminal function as a remote screen controller. The remote screen controller requests a remote screen by transmitting to the image processing device connection information indicating connection to the cloud server, acquires from the image processing device a remote screen corresponding to the operational screen about the job, switches a screen on the display unit to the remote screen, and transmits operational information to the image processing device in response to detection of operation on the remote screen detected by the operational unit.

Fourth, the present invention is intended for a computer-readable recording medium storing a program to be executed by an image processing device capable of communicating with an information processing terminal and a cloud server. According to one aspect of this invention intended for the recording medium, execution of the program by the image processing device makes the image processing device function as a system including: a communication controller to communicate with the information processing terminal; a server connecting unit to make connection to the cloud server based on connection information received from the information processing terminal connected to the cloud server and acquire an operational screen from the cloud server, the operational screen being the same as an operational screen about a job displayed on the information processing terminal; a remote screen generating unit to generate a remote screen based on the operational screen acquired by the server connecting unit from the cloud server and transmit the remote screen to the information processing terminal through the communication controller, the remote screen being used for remote control from the information processing terminal; and a job controller. If operational information received by the communication controller is an order made on the remote screen to execute a job, the job controller executes the job in cooperation with the cloud server.

BRIEF DESCRIPTION OF THE DRAWINGS

FIG. 15 shows an exemplary data structure of a workflow registration database;

DESCRIPTION OF THE PREFERRED EMBODIMENTS

Preferred embodiments of the present invention will be described in detail below. Components common to the preferred embodiments are identified by the same reference numbers, and will not be discussed repeatedly for the same description.

First Preferred Embodiment

Figure 1:
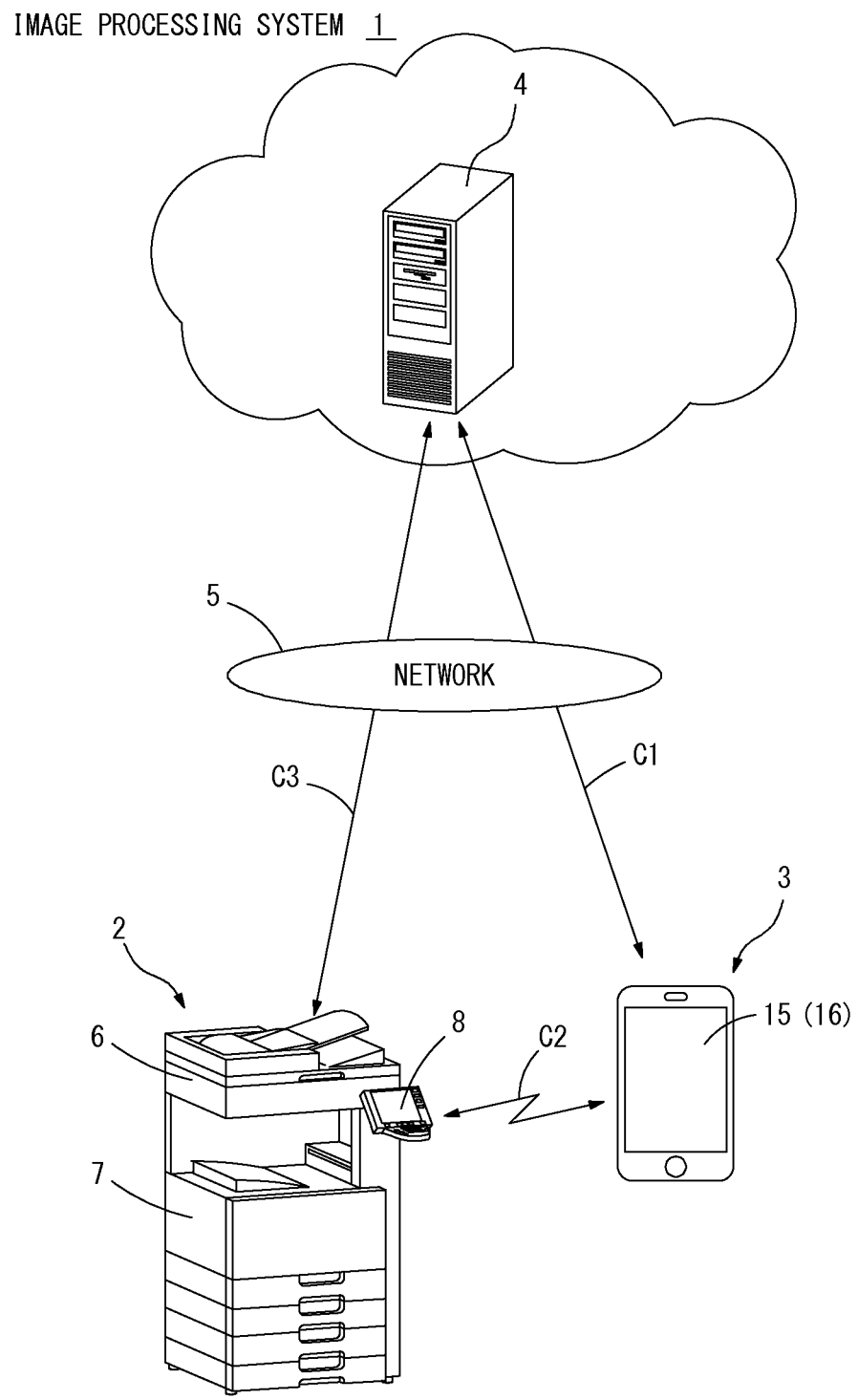
FIG. 1 is a conceptual view showing an exemplary structure of an image processing system.

FIG. 1 is a conceptual view showing an exemplary structure of an image processing system 1 of a first preferred embodiment. The image processing system 1 includes an image processing device 2 composed for example of an MTP, and an information processing terminal 3 a user normally carries. In the image processing system 1, both the image processing device 2 and the information processing terminal 3 are capable of accessing a cloud server 4 providing a cloud service through a network 5. The network 5 covers a LAN, a WAN, a public telephone network, and an Internet network.

The image processing device 2 has the function of making data communication through the network 5 and additionally, has multiple functions including a copying function, a scanning function, a printing function, and a BOX function. The image processing device 2 executes various jobs designated by a user. The scanning function is to read a document by driving a scanner unit 6 arranged in upper part of a body of the image processing device 2, thereby generating image data. The printing function is to make a print output by driving a printer unit 7 arranged in central part of the body of the image processing device 2. The copying function is to output a copy of a document by implementing the scanning and printing functions successively. The BOX function is to store various data in a storage area (BOX) described later. Examples of data to be stored by the BOX function include image data resulting from reading by the scanning function and data received through the network 5. These scanning, printing, and BOX functions can work in cooperation with data communication function implemented through the network 5. In the case of the scanning function, for example, image data generated by reading a document can be transmitted to outside by the data communication function. The printing function can make a print output based on image data acquired from outside by the data communication function. The image processing device 2 having the aforementioned functions is placed in an office or a convenience store, for example.

The image processing device 2 includes an operational panel 8 functioning as a user interface when a user operates the image processing device 2. Based on ordering operation performed by the user on the operational panel 8, for example, the image processing device 2 implements at least one of the aforementioned functions to execute a job designated by the user.

The image processing device 2 further has the function of making short-range radio communication with a specific device within a range of a given distance by way of NFC (near field communication), for example. The short-range radio communication function allows the image processing device 2 to make one-to-one communication with the information processing terminal 3 held by a user who intends to use the image processing device 2. Communication between the image processing device 2 and the information processing terminal 3 is not limited to short-range radio communication but it may also be communication made through the network 5 such as a wireless LAN.

The information processing terminal 3 is a portable information processing terminal composed for example of a tablet terminal or a smartphone and possessed exclusively by one user. The information processing terminal 3 has two radio communication functions: function of making data communication with a different device through the network 5, and function of making one-to-one short-range radio communication with a specific device within a range of a given distance by way of NFC, for example. Various application programs can be installed on the information processing terminal 3. As an example, if a server connection application program is installed in advance on the information processing terminal 3 that allows use of a cloud service provided by the cloud server 4, a user has only to start this application in order to use the cloud service provided by the cloud server 4 anytime and anywhere on the information processing terminal 3.

The information processing terminal 3 becomes functional as a remote panel for the image processing device 2 by making for example short-range radio communication with the image processing device 2. The information processing terminal 3 functioning as the remote panel acquires a display screen on the operational panel 8 of the image processing device 2, and displays the display screen on the display unit 15. When a user performs ordering operation on this display screen, the information processing terminal 3 transmits the ordering operation to the image processing device 2. Thus, the user is allowed to remote control the image processing device 2 from the information processing terminal 3 without operating the operational panel 8 of the image processing device 2 directly.

The information processing terminal 3 may also become functional as a remote panel for the image processing device 2 by making communication with the image processing device 2 through the network 5. The information processing terminal 3 is not limited to a portable terminal such as a tablet terminal or a smartphone but it may also be composed of a personal computer (PC), for example.

The cloud server 4 is placed on the Internet, for example, and provides various cloud services through the Internet. In the first preferred embodiment, the cloud server 4 is described as a server that provides translation service of translating text data in a specific language input through the network 5 into a different language, for example. The cloud server 4 can communicate with each of the information processing terminal 3 and the image processing device 2 through the network 5. The cloud server 4 executes a translation job of translating text data based on an order given from each of the information processing terminal 3 and the image processing device 2.

Generally, a large number of such cloud servers 4 are placed on the Internet and they provide different cloud services. FIG. 1 shows only one of these cloud servers. As an example, according to a cloud service provided by a different cloud server 4, an account is formed for each registered user and a data storage area dedicated to the account is set. By accessing the data storage area through the network 5, the registered user can upload or download data anytime and anywhere.

In the image processing system 1 of the aforementioned structure, a user generally establishes connection C1 to the cloud server 4 using the information processing terminal 3 the user himself or herself holding to use a cloud service provided by the cloud server 4. While the user is to use the translation service provided by the cloud server 4 using the information processing terminal 3, data targeted for translation may contain a large volume so completion of a translation job at the cloud server 4 may take a long time, for example. In response, the information processing terminal 3 is configured to transfer its connection to the cloud server 4 to the image processing device 2, make the image processing device 2 reproduce a status resulting from operation performed so far on the cloud server 4, and make the image processing device 2 and the cloud server 4 work cooperatively to perform subsequent process. Specifically, when the information processing terminal 3 establishes the connection C1 to the cloud server 4, the information processing terminal 3 makes communication C2 to the image processing device 2 by means for example of short-range radio communication, thereby establishing connection C3 between the image processing device 2 and the cloud server 4. Then, the user remote controls the image processing device 2 from the information processing terminal 3 appropriately to make the image processing device 2 work in cooperation with the cloud server 4 to execute a job. The information processing terminal 3 and the image processing device 2 forming the image processing system 1 are described in detail below.

Figure 2:
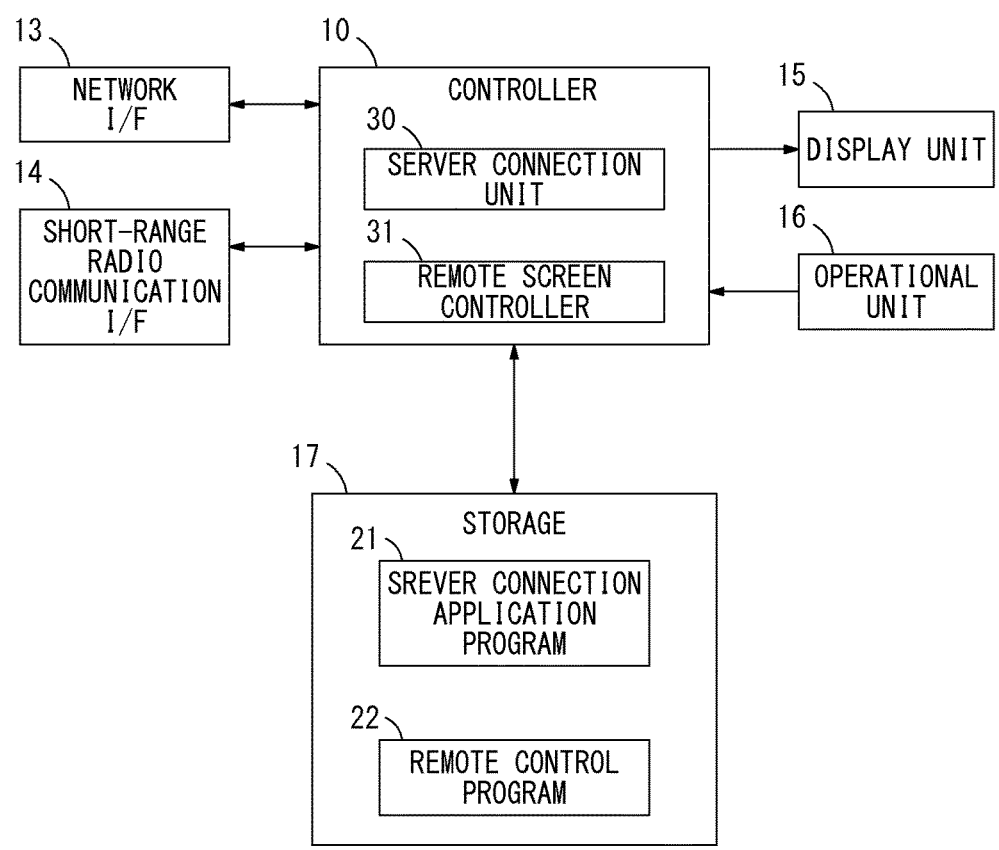
FIG. 2 shows an exemplary hardware structure and an exemplary functional structure of an information processing terminal.

The information processing terminal 3 is described first. FIG. 2 shows an exemplary hardware structure and an exemplary functional structure of the information processing terminal 3. As shown in FIG. 2, the hardware structure of the information processing terminal 3 includes a controller 10, a network interface 13, a short-range radio communication interface 14, the display unit 15, an operational unit 16, and a storage 17. If the information processing terminal 3 is a smartphone, for example, it further includes a microphone, a speaker and the like for a telephone call.

The controller 10 includes a CPU and a memory not shown in the drawings. The CPU executes various programs to control the respective operations of the aforementioned units collectively. The network interface 13 is to allow the controller 10 to make data communication through the network 5. The short-range radio communication interface 14 is to allow the controller 10 to make short-range radio communication with the image processing device 2, for example. The short-range radio communication interface 14 has the function of automatically detecting the image processing device 2 within a range of a given distance that permits short-range radio communication, and notifying the controller 10 of a result of the detection, for example. The display unit 15 is composed for example of a color liquid crystal display and presents various information to a user of the information processing terminal 3. The operational unit 16 is composed for example of a multi-touch touch panel sensor arranged on a display screen of the display unit 15. The operational unit 16 accepts operational input made by the user of the information processing terminal 3. The storage 17 is a nonvolatile storage composed for example of a solid state drive (SSD). The storage 17 stores a server connection application program 21 that allows use of a cloud service provided by the cloud server 4, and a remote control program 22 that makes the information processing terminal 3 function as a remote panel for the image processing device 2. The programs 21 and 22 are installed in advance on the storage 17 and to be executed by the CPU of the controller 10. The server connection application program 21 may simply browser software used to browse a general Web page, for example. The storage 17 additionally stores an operating system of the information processing terminal 3, various programs and data not shown in the drawings.

The controller 10 reads the server connection application program 21 from the storage 17 based on ordering operation by a user and starts the program 21, so that it becomes functional as a server connecting unit 30. The server connecting unit 30 makes connection to the cloud server 4 through the network 5 based on user's operation detected by the operational unit 16, acquires an operational screen about a job from the cloud server 4, and displays the operational screen on the display unit 15. If the operational unit 16 detects operation on the operational screen acquired from the cloud server 4, the server connecting unit 30 transmits operational information resulting from the operation to the cloud server 4. As a result, the operational screen acquired from the cloud server 4 can be updated and the cloud server 4 can be ordered to execute a job.

Figure 3:
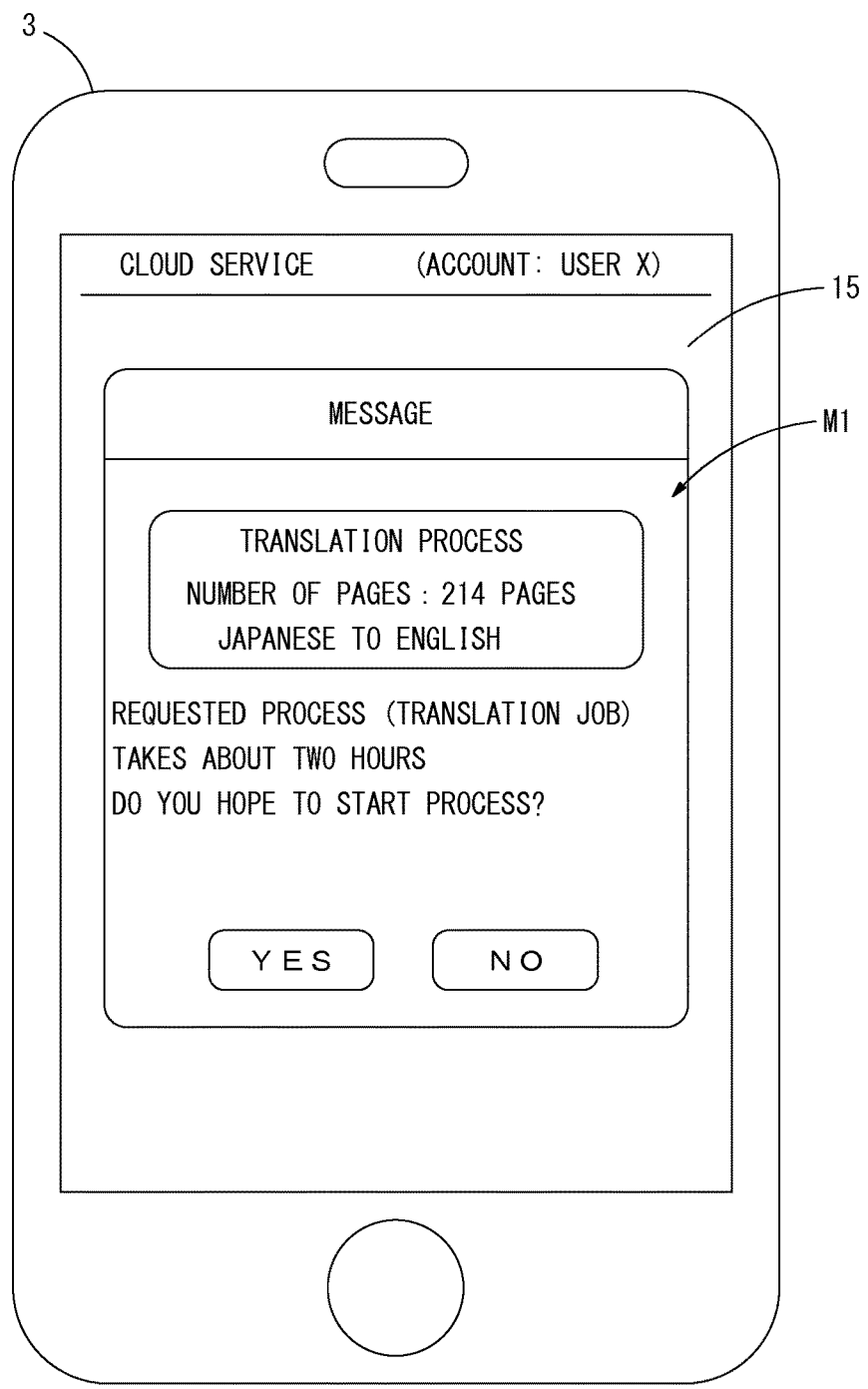
FIG. 3 shows an example of an operational screen acquired by the information processing terminal from a cloud server and displayed on the information processing terminal.

FIG. 3 shows an example of an operational screen M1 displayed on the display unit 15 of the information processing terminal 3 by the server connecting unit 30. A user is requested to make a decision on the operational screen M1 of FIG. 3 as to whether a translation job is to be executed. The user can order the cloud server 4 to execute the translation job by operating a button YES while the operational screen M1 is displayed.

In response to power-on of the information processing terminal 3, the controller 10 reads the remote control program 22 from the storage 17 and starts the program 22, so that it becomes functional as a remote screen controller 31 as shown in FIG. 2. The remote screen controller 31 works in cooperation with the image processing device 2 by making communication with the image processing device 2, thereby making the information processing terminal 3 function as a remote panel for the image processing device 2. The remote screen controller 31 is resident in the controller 10 and checks to see whether the server connecting unit 30 has been actuated and has established connection to the cloud server 4. If the server connecting unit 30 has established connection to the cloud server 4, the remote screen controller 31 transmits to the image processing device 2 information indicating the connection to the cloud server 4 at a given time to make the image processing device 2 make connection to the cloud server 4. Then, the remote screen controller 31 makes the image processing device 2 acquire an operational screen same as that acquired by the server connecting unit 30 from the cloud server 4.

While the server connecting unit 30 makes connection to the cloud server 4, the remote screen controller 31 transmits connection information to the image processing device 2 at a time when the short-range radio communication interface 14 detects the image processing device 2 that can make short-range radio communication, or when the operational unit 16 detects operation by a user requesting a remote screen. Accordingly, if the user moves the information processing terminal 3 closer to the image processing device 2 while an operational screen provided from the cloud server 4 by actuating the server connecting unit 30 is displayed on the display unit 15 of the information processing terminal 3, connection information is transmitted to the image processing device 2. The user may not move the information processing terminal 3 closer to the image processing device 2 but the user may request a remote screen from the image processing device 2 by operating the information processing terminal 3. In response, connection information is transmitted through the network 5 to the image processing device 2. In the first preferred embodiment, operation of moving the information processing terminal 3 closer to the image processing device 2 and operation of requesting a remote screen on the information processing terminal 3 correspond to making an order for cooperation intended to make the image processing device 2 and the cloud server 4 work cooperatively.

Connection information transmitted from the remote screen controller 31 to the image processing device 2 contains the address (URL) of the cloud server 4 connected to the server connecting unit 30 and every information having been input by a user after the server connecting unit 30 is actuated. As an example, the connection information contains identification information input by the user such as user ID or a password for logon to the cloud server 4. As another example, the connection information contains history information relating to various operations performed by the user from when the user logs on to the cloud server 4 until when a current operational screen is displayed. Accordingly, by transmitting the connection information, the remote screen controller 31 can make the image processing device 2 reproduce the same access status as that of the server connecting unit 30 while the server connecting unit 30 accesses the cloud server 4.

Next, the remote screen controller 31 acquires from the image processing device 2 a remote screen corresponding to an operational screen same as that acquired by the server connecting unit 30 from the cloud server 4, and displays the remote screen on the display unit 15. As a result, a display screen on the display unit 15 is switched to the operational screen acquired by the image processing device 2 from the cloud server 4. After the screen switching, if the operational unit 16 detects operation on the operational screen acquired from the image processing device 2, the remote screen controller 31 transmits operational information resulting from the operation to the image processing device 2. As a result, the operational screen acquired from the image processing device 2 can be updated and the image processing device 2 can be ordered to execute a job.

Figure 4:
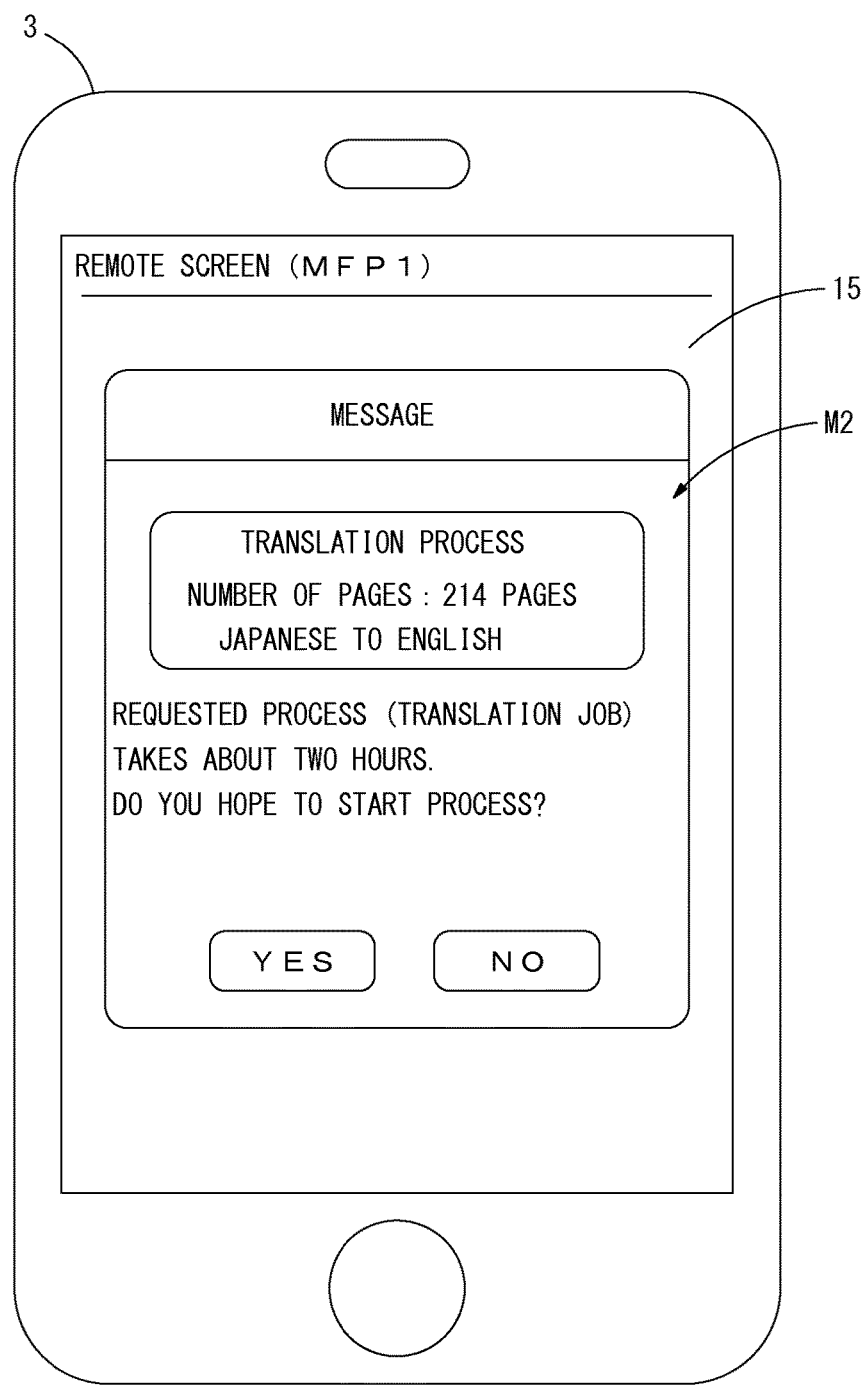
FIG. 4 shows an example of an operational screen displayed based on a remote screen acquired by the information processing terminal from an image processing device.

FIG. 4 shows an example of an operational screen M2 displayed on the display unit 15 of the information processing terminal 3 by the remote screen controller 31. A user is requested to make a decision on the operational screen M2 of FIG. 4 as to whether a translation job is to be executed. Specifically, by transmitting the operational information described above, the remote screen controller 31 makes the image processing device 2 acquire an operational screen same as that acquired by the server connecting unit 30. Thus, the operational screen M2 displayed on the display unit 15 based on the remote screen acquired by the remote screen controller 31 from the image processing device 2 is substantially the same as the operational screen M1 (see FIG. 3) acquired by the server connecting unit 30 from the cloud server 4. If the user operates a button YES while the operational screen M2 is displayed, the remote screen controller 31 transmits operational information to the image processing device 2. Then, the image processing device 2 orders the cloud server 4 to execute a translation job.

Figure 5:
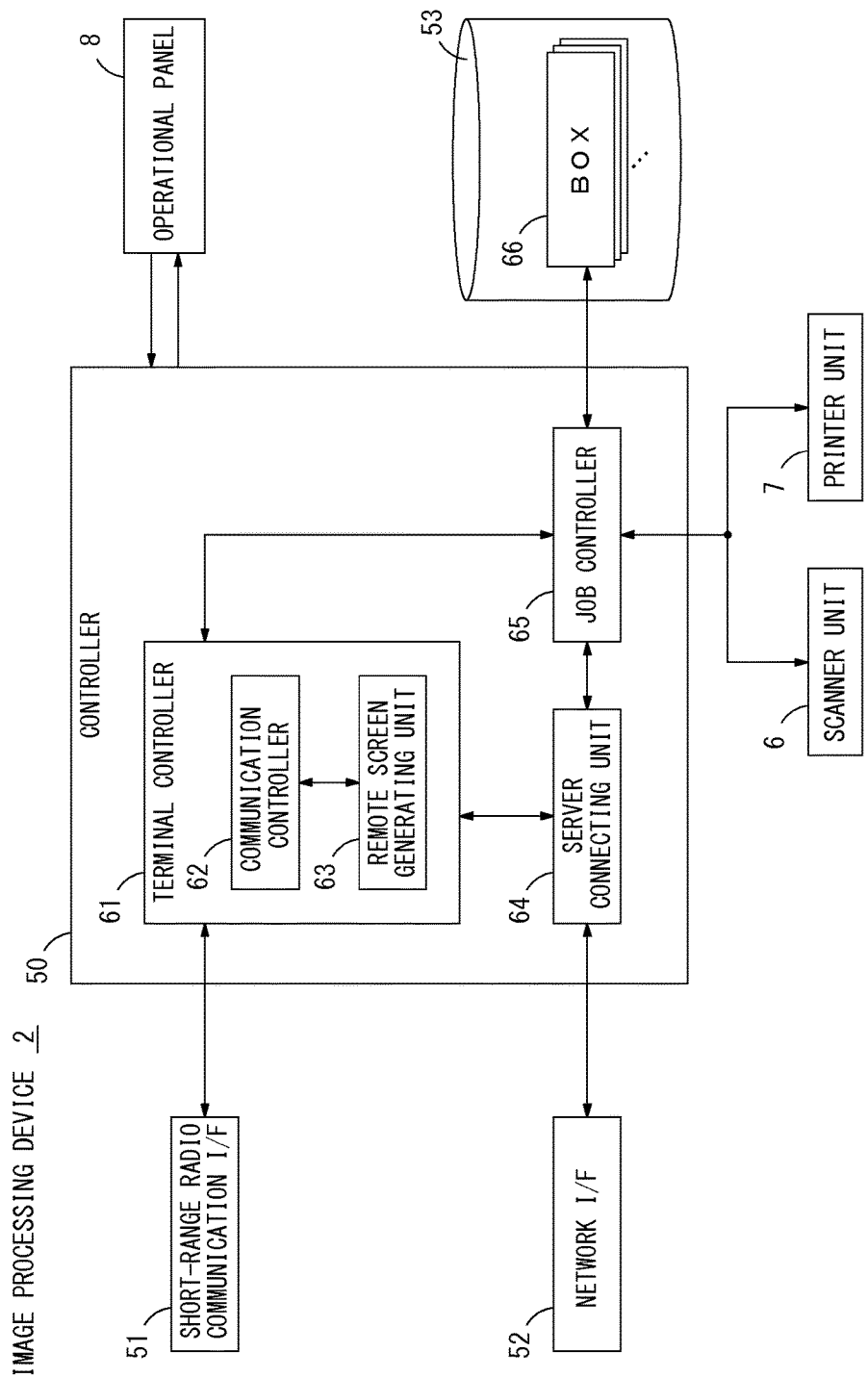
FIG. 5 shows an exemplary hardware structure and an exemplary functional structure of the image processing device.

The image processing device 2 is described next. FIG. 5 shows an exemplary hardware structure and an exemplary functional structure of the image processing device 2. As shown in FIG. 5, the hardware structure of the image processing device 2 includes the aforementioned scanner unit 6, the printer unit 7 and the operational panel 8 and additionally, a controller 50, a short-range radio communication interface 51, a network interface 52, and a storage 53.

The controller 50 includes a CPU and a memory not shown in the drawings. The CPU executes a certain program to control the respective operations of the aforementioned units collectively. The short-range radio communication interface 51 is to allow the controller 50 to make short-range radio communication with the information processing terminal 3. The short-range radio communication interface 51 has the function of automatically detecting the information processing terminal 3 within a range of a given distance that permits short-range radio communication, and notifying the controller 50 of a result of the detection, for example. The network interface 52 is to allow the controller 50 to make data communication through the network 5. The storage 53 is a nonvolatile storage composed for example of a hard disk drive (HDD) or a solid state drive (SSD). The storage 53 includes multiple BOXs 66 as storage areas storing image data the scanner unit 6 generated by reading a document and data received through the network interface 52, for example. Additionally, the storage 53 preliminarily stores a program to be executed by the CPU of the controller 50, for example.

In response to execution of the program by the CPU, the controller 50 becomes functional as a terminal controller 61, a server connecting unit 64, and a job controller 65.

The terminal controller 61 is a processor to communicate with the remote screen controller 31 of the information processing terminal 3 to display a remote screen on the display unit 15 of the information processing terminal 3. The terminal controller 61 includes a communication controller 62 to communicate with the information processing terminal 3 for example through the short-range radio communication interface 51, and a remote screen generating unit 63 to generate a remote screen to be displayed on the information processing terminal 3 and transmits the resultant remote screen to the information processing terminal 3 through the communication controller 62.

The server connecting unit 64 is to make connection to the cloud server 4 through the network interface 52. If the communication controller 62 receives from the information processing terminal 3 connection information indicating connection to the cloud server 4, the server connecting unit 64 makes connection to the cloud server 4 based on the connection information to establish the same access status as that of the information processing terminal 3. Then, the server connecting unit 64 acquires from the cloud server 4 an operational screen about a job same as that displayed on the information processing terminal 3 and outputs the operational screen to the remote screen generating unit 63.

The job controller 65 is to control a job to be executed by the image processing device 2 by controlling the scanner unit 6, the printer unit 7, and the storage 53. The job controller 65 can work in cooperation with the server connecting unit 64. As an example, if the server connecting unit 64 receives translated data from the cloud server 4, the job controller 65 can store the translated data into the BOX 66 or can make a print output of the translated data by outputting the translated data to the printer unit 7. Further, the job controller 65 can output data as a translation target the scanner unit 6 generated by reading a document, thereby uploading the data onto the cloud server 4.

If the server connecting unit 64 receives an operational screen from the cloud server 4, the remote screen generating unit 63 converts the operational screen for example to a bitmap image to generate a remote screen, and transmits the remote screen to the information processing terminal 3. If the communication controller 62 receives operational information thereafter indicating operation on the remote screen, the remote screen generating unit 63 executes process based on the operational information. If the operational information indicates operation involving the cloud server 4, for example, the remote screen generating unit 63 outputs the operational information to the server connecting unit 64. As a result, the operational information about operation on the remote screen is transmitted to the cloud server 4.

If the operational information indicates setting operation on a job involving the job controller 65 (such as print setting for print output or setting for document reading), the remote screen generating unit 63 acquires for example from the operational panel 8 a detailed setting screen about the job reflecting the setting operation on the job and generates a remote screen based on the detailed setting screen about the job. The remote screen generating unit 63 transmits this remote screen to the information processing terminal 3, thereby making a user check the detailed setting screen about the job reflecting the setting operation on the job.

If the server connecting unit 64 receives a new operational screen for a second or subsequent time from the cloud server 4, the remote screen generating unit 63 determines whether this operational screen involves operation by a user of the information processing terminal 3. If this operational screen involves operation by the user, the remote screen generating unit 63 updates a remote screen based on the operational screen. If an operational screen newly acquired from the cloud server 4 is a check screen merely indicating an execution status of a translation job and does not involve operation by the user, for example, the remote screen generating unit 63 does not generate a remote screen based on this operational screen. In this case, a remote screen is not transmitted to the information processing terminal 3 so that a remote screen displayed on the information processing terminal 3 is not updated. Thus, the user of the information processing terminal 3 is not required to check each screen not involving user's operation, so that the user can complete a task without caring for the progress of a job, for example.

As described above, based on connection information received by the image processing device 2 from the information processing terminal 3, the image processing device 2 establishes connection to the cloud server 4 same as connection between the information processing terminal 3 and the cloud server 4. This makes it unnecessary to keep direct connection of the information processing terminal 3 to the cloud server 4. Thus, when the server connecting unit 64 acquires from the cloud server 4 an operational screen about a job same as that displayed on the information processing terminal 3, the communication controller 62 transmits an order to the information processing terminal 3 to cut connection to the cloud server 4. In response, the server connecting unit 30 of the information processing terminal 3 cuts connection to the cloud server 4. The information processing terminal 3 thereafter makes the image processing device 2 work in cooperation with the cloud server 4 to execute a job.

Figure 6:
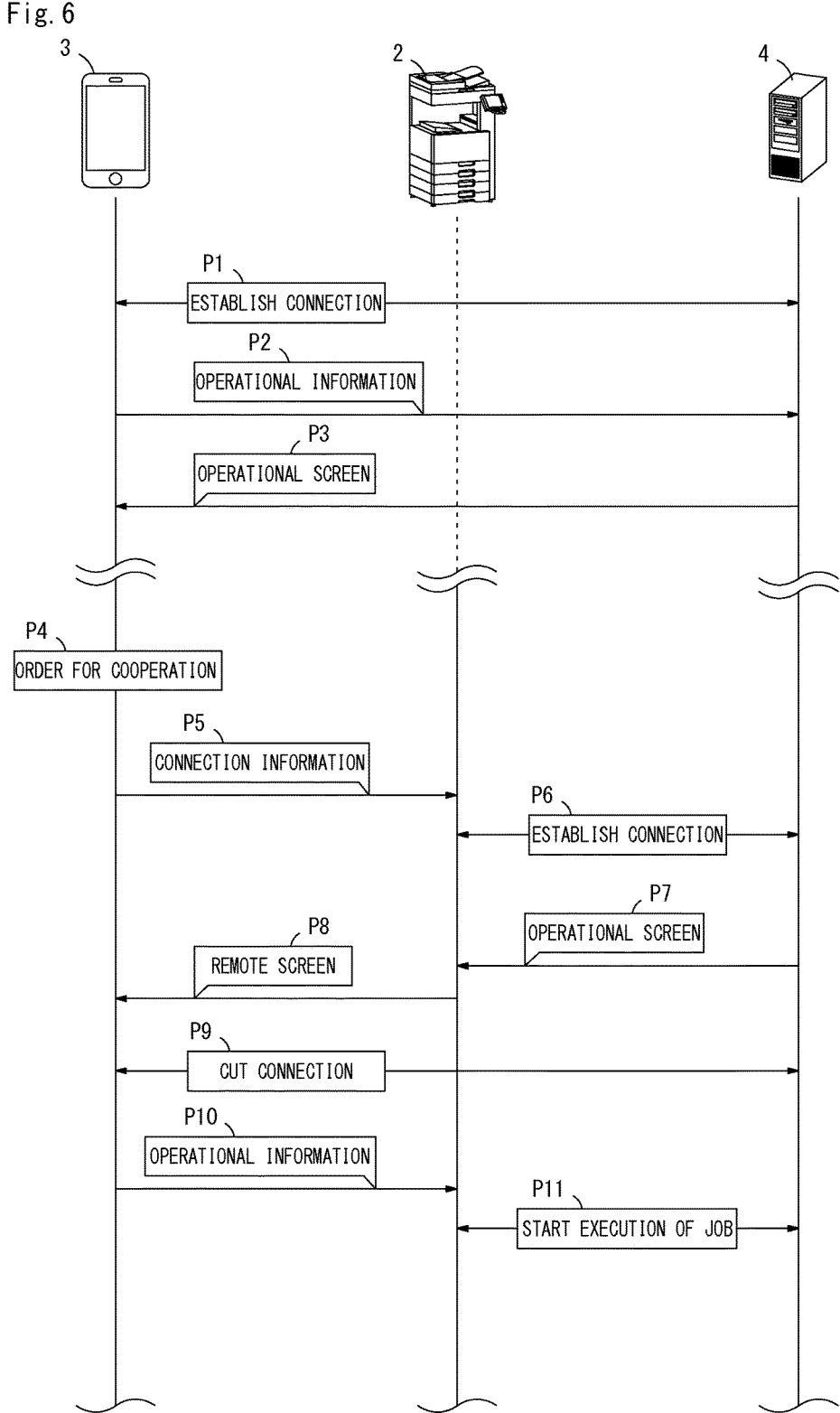
FIG. 6 shows an overview of an operation sequence in the image processing system.

FIG. 6 shows an overview of an operation sequence in the image processing system 1 of the first preferred embodiment. As shown in FIG. 6, the information processing terminal 3 and the cloud server 4 first become connected to each other (process P1). If a user performs operation on the information processing terminal 3 in this condition, operational information corresponding to the operation is transmitted to the cloud server 4 (process P2). Then, an operational screen is transmitted from the cloud server 4 to the information processing terminal 3 (process P3). Next, the user makes an order for cooperation (process P4). In response, the information processing terminal 3 transmits connection information to the image processing device 2 (process P5). The image processing device 2 establishes connection to the cloud server 4 based on the connection information (process P6). The connection established at this time is the same as the connection established between the information processing terminal 3 and the cloud server 4. After establishing the connection to the cloud server 4, the image processing device 2 acquires from the cloud server 4 an operational screen same as that displayed on the information processing terminal 3 (process P7). Then, the image processing device 2 generates a remote screen and transmits the remote screen to the information processing terminal 3 (process P8). This switches a screen on the information processing terminal 3 to the remote screen. Then, in response to an order for cutting received from the image processing device 2, the information processing terminal 3 cuts the connection to the cloud server 4 (process P9). If the user performs operation on the remote screen thereafter, operational information corresponding to the operation is transmitted to the image processing device 2 (process P10). If the operational information transmitted at this time is one that orders the cloud server 4 to execute a translation job, it is transmitted from the image processing device 2 to the cloud server 4. Then, the image processing device 2 and the cloud server 4 work cooperatively to start the job (process P11). After the job is started, the image processing device 2 and the cloud server 4 work cooperatively to continue the job even if the user carries the information processing terminal 3 into a radio wave environment that does not permit connection of the information processing terminal 3 to the cloud server 4. As a result, after ordering execution of the job, the user is not required to wait for completion of the job and can go out with the information processing terminal 3.

In this operation sequence, after communication between the information processing terminal 3 and the image processing device 2 is started, the communication is not required to continue. Instead, each time the information processing terminal 3 and the image processing device 2 are to communicate with each other as shown by processes P5, P8 and P10, for example, communication may be established therebetween.

The following describes respective procedures of processes in detail performed by the information processing terminal 3 and the image processing device 2 to realize the aforementioned operation sequence.

Figure 7:
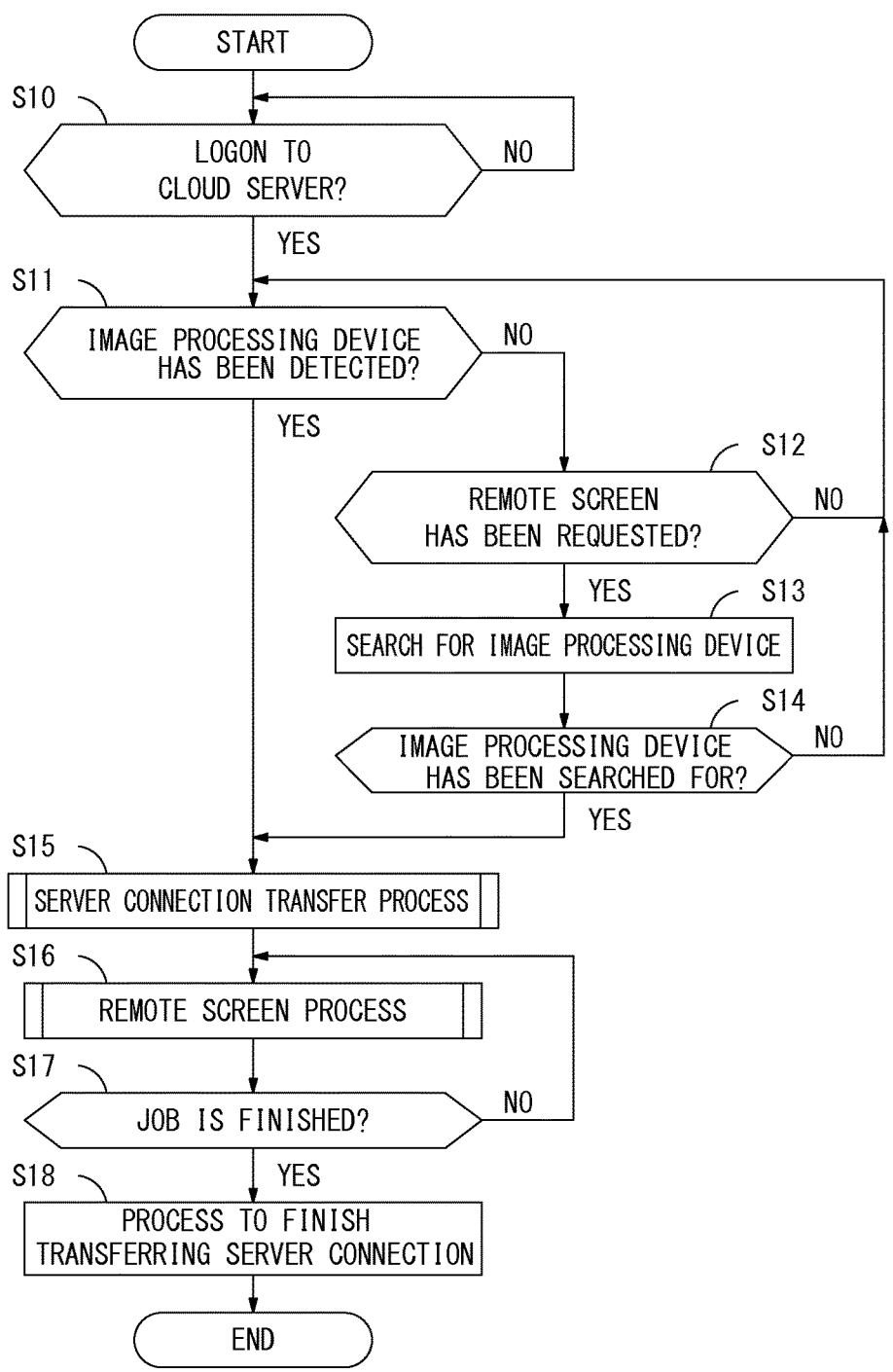
FIG. 7 is a flowchart explaining an example of detailed procedure of process performed by the information processing terminal.
Figure 8:
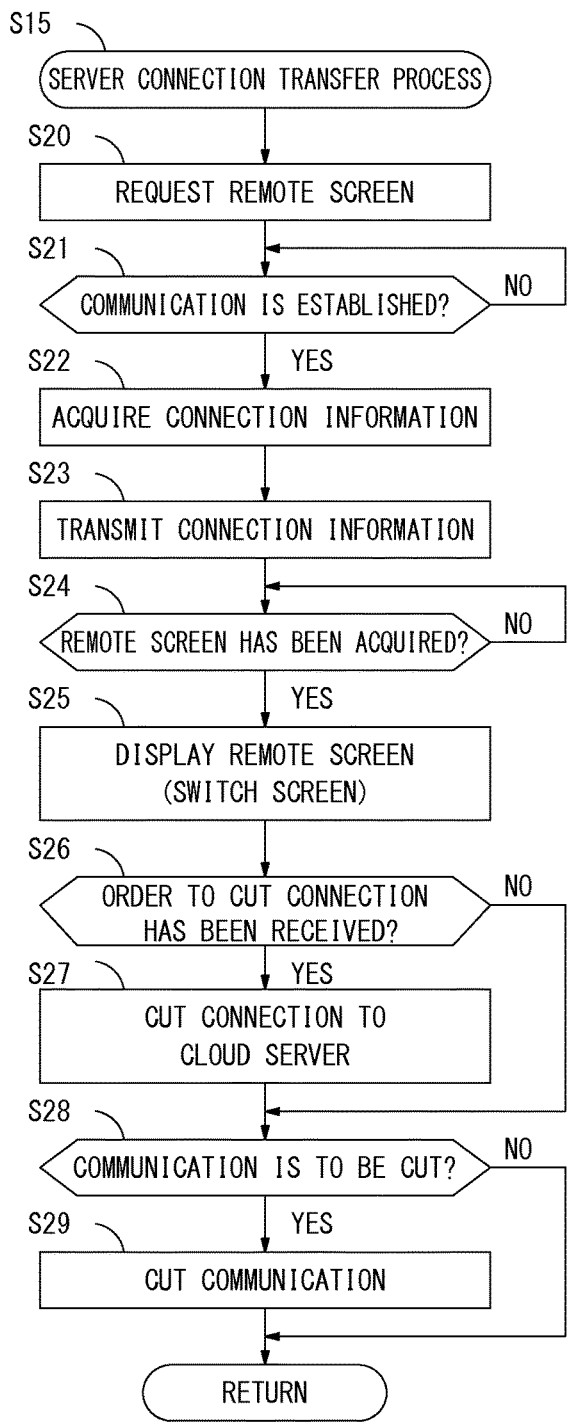
FIG. 8 is a flowchart explaining an example of procedure of server connection transfer process in detail.
Figure 9:
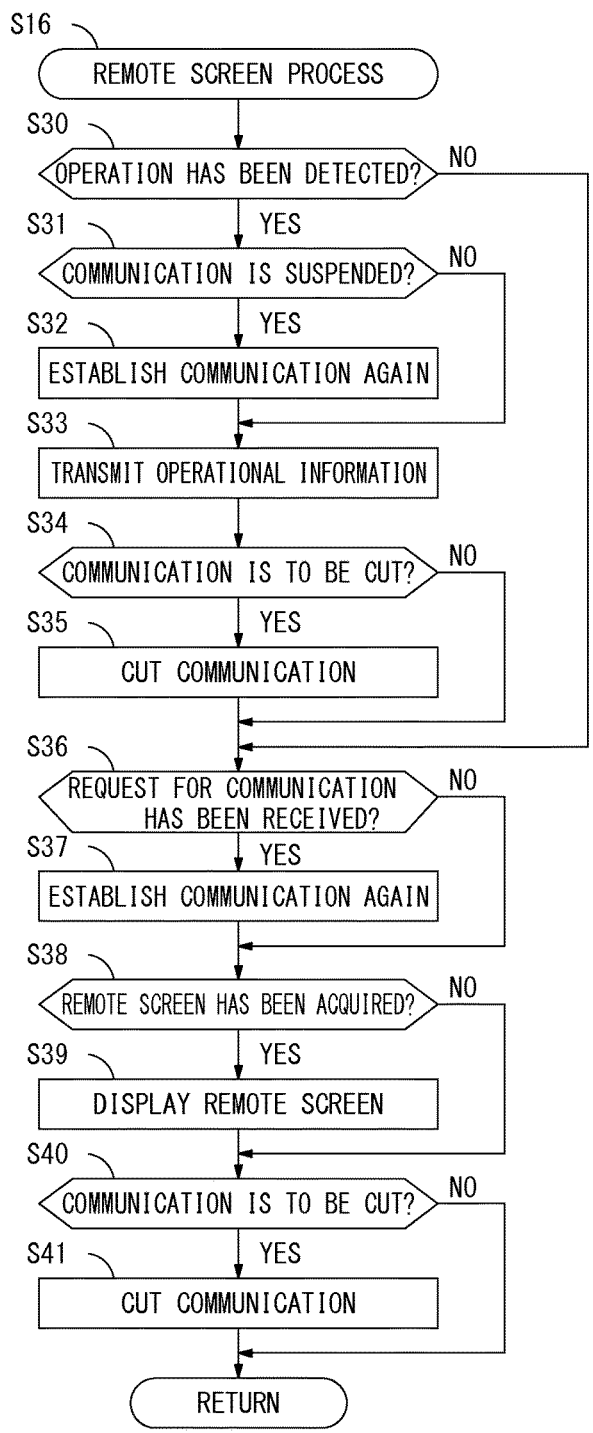
FIG. 9 is a flowchart explaining an example of procedure of remote screen process in detail.

FIGS. 7 to 9 are flowcharts explaining an example of detailed procedure of the process performed by the information processing terminal 3. This process is mainly performed by the remote screen controller 31 of the information processing terminal 3. When this process is started, the server connecting unit 30 is actuated in the controller 10 and the remote screen controller 31 is placed in standby until the server connecting unit 30 logs onto the cloud server 4 (step S10). If the server connecting unit 30 logs onto the cloud server 4 (YES of step S10), the remote screen controller 31 determines whether the image processing device 2 has been detected that can make short-range radio communication (step S11). If the image processing device 2 has been detected that can make short-range radio communication (YES of step S11), the flow proceeds to step S15. If the image processing device 2 has not been detected that can make short-range radio communication (NO of step S11), the remote screen controller 31 further determines whether a user has requested a remote screen (step S12). If the user has not requested a remote screen, the flow returns to step S11. If the user has requested a remote screen (YES of step S12), the remote screen controller 31 searches for the image processing device 2 that can communicate with the information processing terminal 3 (step S13). Here, as an example, the remote screen controller 31 searches for the image processing device 2 within a range that allows communication through the short-range radio communication interface 14. The remote screen controller 31 further searches for the image processing device 2 that can communicate with the information processing terminal 3 through the network interface 13. If the image processing device 2 that can communicate with the information processing terminal 3 is extracted (YES of step S14), the flow proceeds to step S15. If this image processing device 2 is not extracted (NO of step S14), the flow returns to step S11. If the user does not go out of an office, the image processing device 2 connected to the network 5 is searched for. In this case, a result of step S14 is substantially always YES.

If a result of step S11 or S14 is not YES, the steps S11 to S14 are repeated. In the meantime, the server connecting unit 30 continuously transmits operational information to the cloud server 4 based on operation by the user, and receives an operational screen from the cloud server 4 and displays the received operational screen on the display unit 15.

In step S15, the remote screen controller 31 performs server connection transfer process. The server connection transfer process (step S15) is to transfer connection of the information processing terminal 3 to the cloud server 4 to the image processing device 2. FIG. 8 is a flowchart explaining an example of procedure of the server connection transfer process (step S15) in detail. When this process is started, the remote screen controller 31 first requests a remote screen from the image processing device 2 to start communication with the image processing device 2 (step S20). When the communication with the image processing device 2 is established (YES of step S21), the remote screen controller 31 acquires connection information from the server connecting unit 30 (step S22), and transmits the connection information to the image processing device 2 (step S23). Next, the remote screen controller 31 is placed in standby until a remote screen is acquired from the image processing device 2 (step S24). If the remote screen is acquired (YES of step S24), the remote screen controller 31 displays the acquired remote screen on the display unit 15. As a result, a screen on the display unit 15 is switched from the operational screen acquired by the server connecting unit 30 from the cloud server 4 to an operational screen corresponding to the remote screen acquired by the remote screen controller 31 from the image processing device 2 (step S25).

After switching a display screen to the remote screen, the remote screen controller 31 determines whether an order to cut connection to the cloud server 4 has been received from the image processing device 2 (step S26). If the order for cutting has been received (YES of step S26), the remote screen controller 31 orders the server connecting unit 30 to cut the connection to the cloud server 4 (step S27). At this time, the operation of the server connecting unit 30 may be finished. This prevents unnecessary traffic between the information processing terminal 3 and the cloud server 4. Avoiding unnecessary subsequent communication between the information processing terminal 3 and the cloud server 4 contributes reduction of consumption power of the information processing terminal 3, particularly if the information processing terminal 3 is a portable information processing terminal such as a tablet terminal or a smartphone.

Further, the remote screen controller 31 determines whether communication with the image processing device 2 is to be cut once (step S28). The remote screen controller 31 makes this determination based on a setting selected in advance by the user when communication with the image processing device 2 is started, for example. Specifically, if the setting selected by the user is such that communication between the image processing device 2 and the information processing terminal 3 is to be established each time a need for the communication arises, and that communication therebetween is to be cut each time a need for the cutting arises, a result of step S28 becomes YES. If the communication is to be cut as a result of the determination (YES of step S28), the communication with the image processing device 2 is cut (step S29). This temporarily suspends communication between the information processing terminal 3 and the image processing device 2 until communication is restarted therebetween. Then, the server connection transfer process (step S15) is finished.

Referring back to FIG. 7, the remote screen controller 31 thereafter performs remote screen process (step S16). In the remote screen process (step S16), operational information resulting from operation on the remote screen by the user is transmitted to the image processing device 2, or a newly updated remote screen received from the image processing device 2 is displayed. FIG. 9 is a flowchart explaining an example of procedure of the remote screen process (step S16) in detail. When this process is started, the remote screen controller 31 determines whether operation on the remote screen by the user has been detected (step S30). If the user's operation has not been detected (NO of step S30), the flow proceeds to step S36. If the user's operation has been detected (YES of step S30), the remote screen controller 31 determines whether communication with the image processing device 2 is suspended (step S31). If the communication is suspended, the remote screen controller 31 transmits a request for communication to the image processing device 2 to establish communication with the image processing device 2 again (step S32). Then, the remote screen controller 31 transmits operational information resulting from user's operation to the image processing device 2 (step S33). If the user's operation is one that orders the cloud server 4 to execute a job, for example, the operational information transmitted to the image processing device 2 is transferred from the image processing device 2 to the cloud server 4. In response, the cloud server 4 starts execution of the job. In this case, the cloud server 4 works in cooperation with the image processing device 2 to execute the job while notifying the image processing device 2 of the progress of the job, for example. After transmitting the operational information, like in step S28, the remote screen controller 31 determines whether communication with the image processing device 2 is to be cut once (step S34). If the communication is to be cut (YES of step S34), the remote screen controller 31 cuts the communication with the image processing device 2 (step S35).

Next, the remote screen controller 31 determines whether a request for communication has been received from the image processing device 2 (step S36). If the request has been received, the remote screen controller 31 establishes communication with the image processing device 2 again (step S37). Next, the remote screen controller 31 determines whether a new remote screen has been acquired from the image processing device 2 (step S38). If a new remote screen has been acquired (YES of step S38), the remote screen controller 31 updates a display screen on the display unit 15 based on the received remote screen (step S39). Then, like in the aforementioned steps, the remote screen controller 31 determines whether communication with the image processing device 2 is to be cut once (step S40). If the communication is to be cut (YES of step S40), the remote screen controller 31 cuts the communication with the image processing device 2 (step S41). Then, the remote screen process (step S16) is finished.

Referring back to FIG. 7, the remote screen controller 31 repeats the remote screen process (step S16) until the job executed by the cooperation of the image processing device 2 and the cloud server 4 is finished (step S17). If execution of the job is finished (YES of step S17), the remote screen controller 31 finishes displaying the remote screen and performs process to finish transferring its server connection to the image processing device 2 (step S18), thereby completing the procedure.

Figure 10:
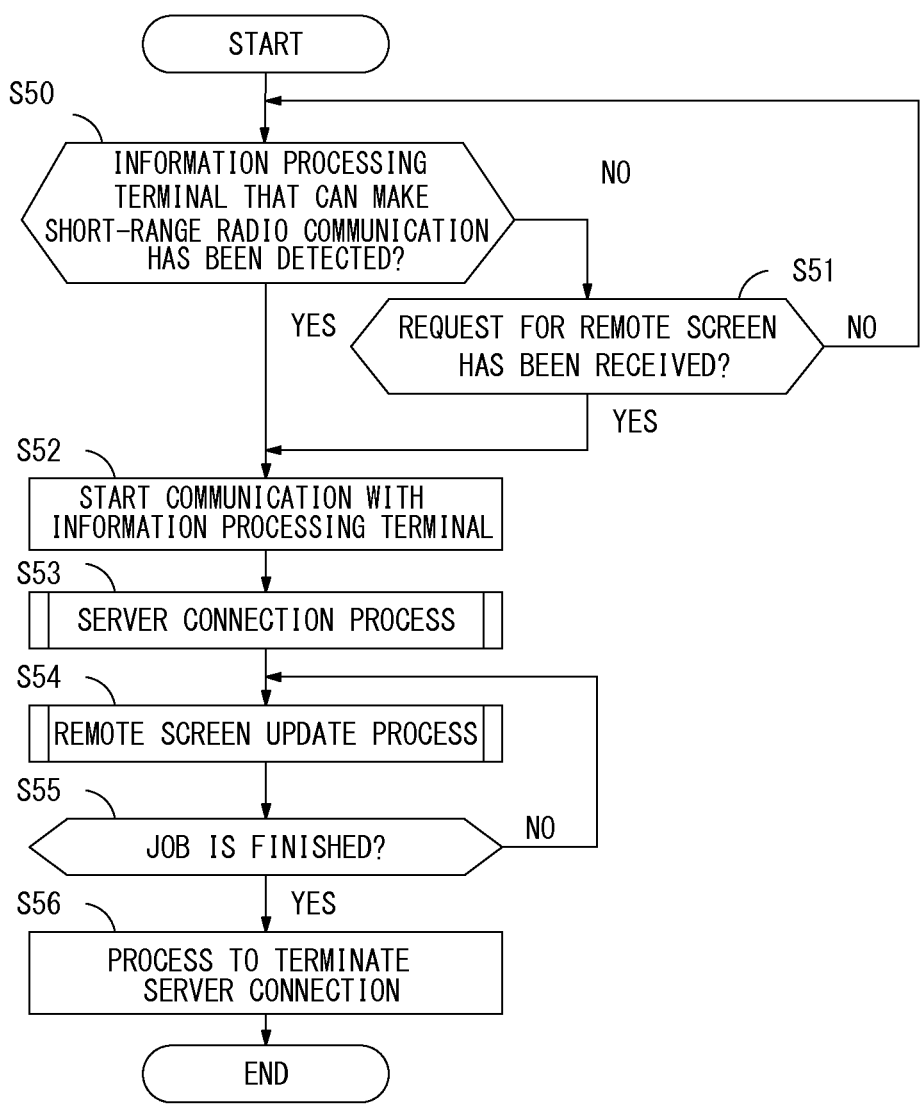
FIG. 10 is a flowchart explaining an example of detailed procedure of process performed by the image processing device.
Figure 11:
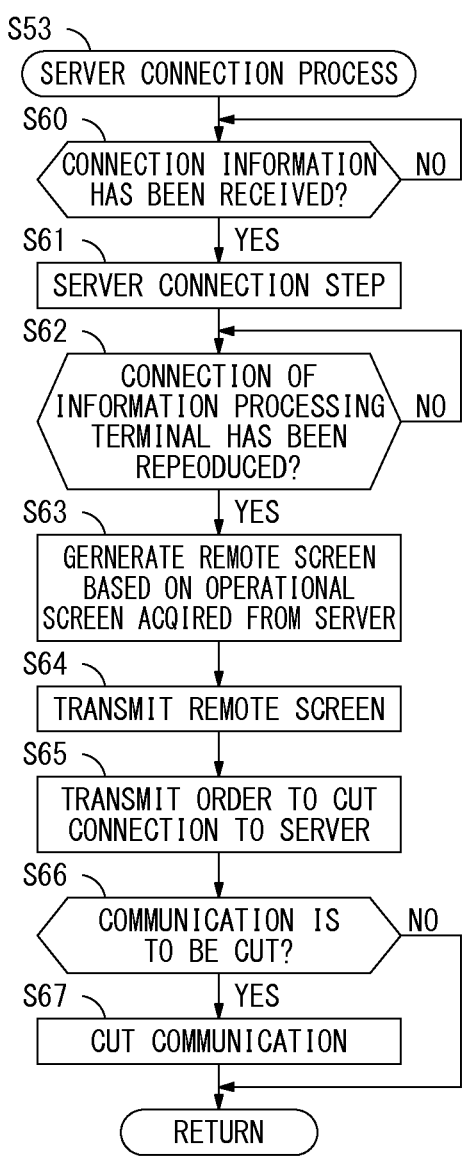
FIG. 11 is a flowchart explaining an example of procedure of server connection process in detail.
Figure 12:
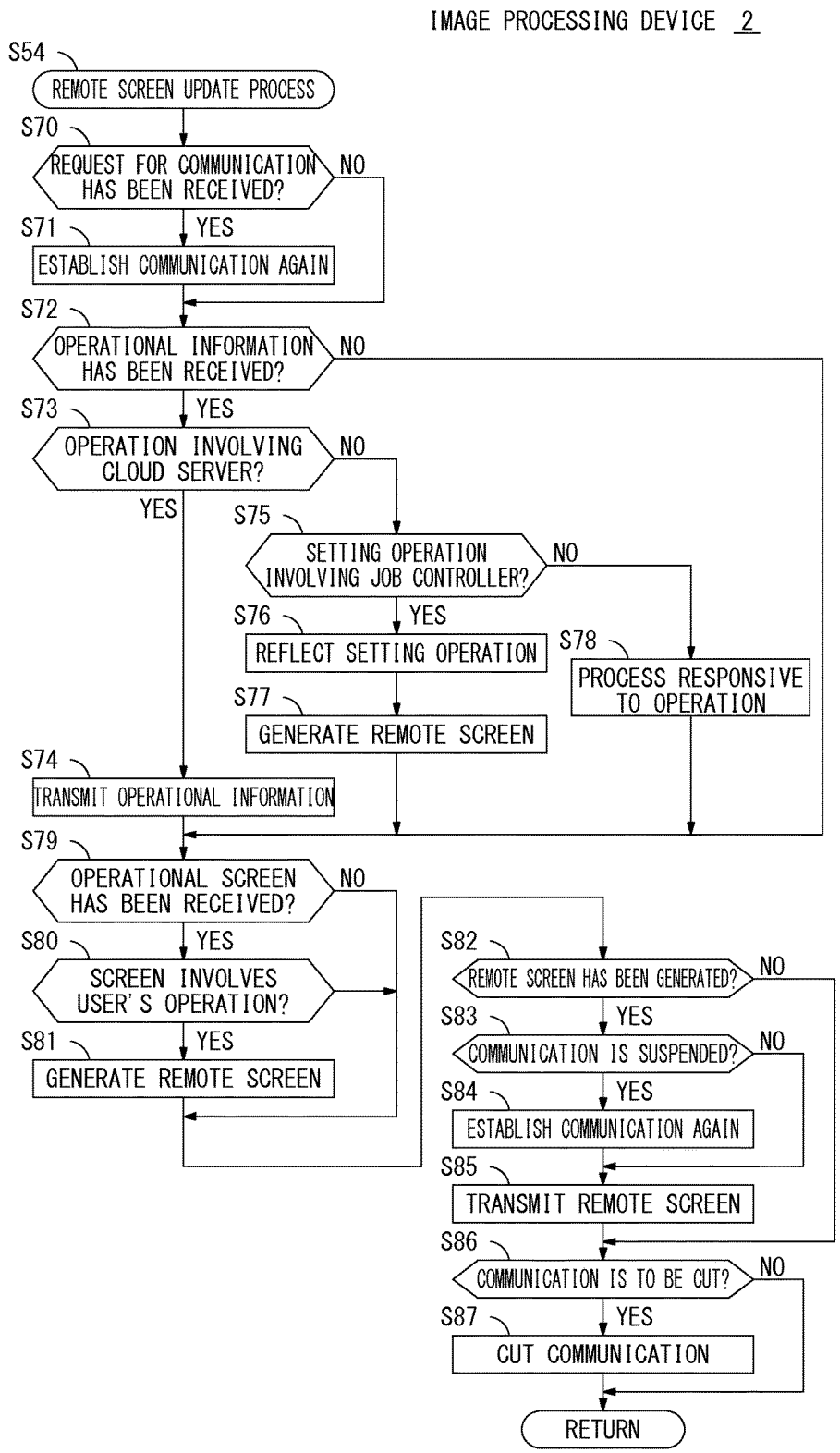
FIG. 12 is a flowchart explaining an example of procedure of remote screen update process in detail.

FIGS. 10 to 12 are flowcharts explaining an example of detailed procedure of the process performed by the image processing device 2. This process is mainly performed by the terminal controller 61 (communication controller 62 and remote screen generating unit 63) of the image processing device 2. When this process is started, the terminal controller 61 determines whether the information processing terminal 3 has been detected that can make short-range radio communication (step S50). If the information processing terminal 3 has been detected that can make short-range radio communication (YES of step S50), the flow proceeds to step S52. If the information processing terminal 3 has not been detected that can make short-range radio communication (NO of step S50), the terminal controller 61 further determines whether a request for a remote screen has been received from the information processing terminal 3 (step S51). If the request for a remote screen has not been received, the flow returns to step S50. If the request for a remote screen has been received (YES of step S51), the flow proceeds to step S52.

In step S52, the terminal controller 61 starts communication with the information processing terminal 3 (step S52) to perform server connection process (step S53). In the server connection process (step S53), the terminal controller 61 makes connection to the cloud server 4 based on connection information received from the information processing terminal 3, and acquires an operational screen same as that acquired by the information processing terminal 3 from the cloud server 4.

FIG. 11 is a flowchart explaining an example of procedure of the server connection process (step S53) in detail. When this process is started, the terminal controller 61 is first placed in standby until connection information is received from the information processing terminal 3 (step S60). If connection information is received (YES of step S60), the terminal controller 61 proceeds to a server connection step (step S61). In this server connection step, the terminal controller 61 outputs the connection information received from the information processing terminal 3 to the server connecting unit 64 to ask the server connecting unit 64 for connection to the cloud server 4. Then, based on the connection information, the server connecting unit 64 makes connection to the cloud server 4 connected to the information processing terminal 3 to reproduce connection same as that established by the information processing terminal 3. The terminal controller 61 is placed in standby until the server connecting unit 64 reproduces connection same as that established by the information processing terminal 3 (step S62). If the same connection is reproduced (YES of step S62), the terminal controller 61 generates a remote screen (step S63) based on an operational screen acquired by the server connecting unit 64 from the cloud server 4, and transmits the remote screen to the information processing terminal 3 (step S64).

Next, the terminal controller 61 transmits to the information processing terminal 3 an order to cut the connection to the cloud server 4 (step S65). In response, the information processing terminal 3 cuts the connection to the cloud server 4. Then, the terminal controller 61 determines whether communication with the information processing terminal 3 is to be cut once (step S66). The terminal controller 61 makes this determination based on a setting selected in advance by a user of the information processing terminal 3 when communication with the information processing terminal 3 is started, for example. Specifically, the terminal controller 61 acquires in advance information about the setting selected by the user of the information processing terminal 3, and makes the determination based on the information. If the communication is to be cut as a result of the determination (YES of step S66), the communication with the information processing terminal 3 is cut (step S67). This temporarily suspends communication between the information processing terminal 3 and the image processing device 2 until communication is restarted therebetween. Then, the server connection process (step S53) is finished.

Referring back to FIG. 10, the terminal controller 61 thereafter performs remote screen update process (step S54). The remote screen update process (step S54) is to update a remote screen to be transmitted to the information processing terminal 3. FIG. 12 is a flowchart explaining an example of procedure of the remote screen update process (step S54) in detail. When this process is started, the terminal controller 61 determines whether a request for communication has been received from the information processing terminal 3 (step S70). If the request has been received (YES of step S70), the terminal controller 61 establishes communication with the information processing terminal 3 again (step S71).

Next, the terminal controller 61 determines whether operational information has been received from the information processing terminal 3 (step S72). If operational information has not been received (NO of step S72), the flow proceeds to step S79. If operational information has been received (YES of step S72), the terminal controller 61 determines whether the operational information indicates operation involving the cloud server 4 (step S73). If the operational information indicates operation involving the cloud server 4 (YES of step S73), the terminal controller 61 transmits the operational information to the cloud server 4 (step S74). If the operation by the user is one that orders the cloud server 4 to execute a job, for example, the terminal controller 61 transmits the operational information to the cloud server 4. In response, the cloud server 4 starts execution of the job. In this case, the cloud server 4 executes the job in cooperation with the image processing device 2.

If the user's operation is not one that orders the cloud server 4 to execute a job (NO of step S73), the terminal controller 61 determines whether the user's operation indicates setting operation on a job involving the job controller 65 (step S75). If the user's operation indicates setting operation on a job involving the job controller 65 (YES of step S75), the terminal controller 61 acquires a detailed setting screen about the job reflecting the setting operation on the job (step S76), and generates a remote screen based on the detailed setting screen (step S77). The remote screen generated in this step contains all detailed setting items that can be set about the scanner unit 6 or the printer unit 7 of the image processing device 2, for example, and is substantially the same as an operational screen displayed on the operational panel 8.

If determining that the user's operation does not indicate setting operation on a job involving the job controller 65 (NO of step S75), the terminal controller 61 performs process responsive to the user's operation (step S78). As an example, if the user of the information processing terminal 3 has ordered execution of a scan job to be executed to read a document as a target for a translation job by the cloud server 4, the terminal controller 61 asks the job controller 65 to execute the scan job based on the user's operation. Then, the job controller 65 transmits image data generated by the scanner unit 6 to the cloud server 4 through the server connecting unit 64. In response, the cloud server 4 starts the translation job.

Next, the terminal controller 61 determines whether the server connecting unit 64 has acquired a new operational screen from the cloud server 4 (step S79). If a new operational screen has been acquired (YES of step S79), the terminal controller 61 determines whether this operational screen involves operation by the user (step S80). If this operational screen involves operation by the user, the terminal controller 61 generates a remote screen based on the new operational screen (step S81). If this operational screen does not involve operation by the user, the terminal controller 61 does not generate a remote screen based on this operational screen.

Next, the terminal controller 61 determines whether a remote screen to be transmitted to the information processing terminal 3 has been generated in step S77 or S81 (step S82). If such a remote screen has been generated (YES of step S82), the terminal controller 61 determines whether communication with the information processing terminal 3 is suspended (step S83). If the communication is suspended, the terminal controller 61 establishes communication with the image processing device 2 again. Then, the terminal controller 61 transmits the remote screen generated in step S77 or S81 to the information processing terminal 3 (step S85). Steps S83 to S85 are bypassed if a remote screen has not been generated. Then, like in step S66, the terminal controller 61 determines whether communication with the information processing terminal 3 is to be cut once (step S86). If the communication is to be cut (YES of step S86), the communication with the information processing terminal 3 is cut (step S87). Then, the remote screen update process (step S54) is finished.

Referring back to FIG. 10, the terminal controller 61 repeats the remote screen update process (step S54) until the job executed by the cooperation of the image processing device 2 and the cloud server 4 is finished (step S55). If execution of the job is finished (YES of step S55), the terminal controller 61 performs connection termination process to cut connection to the cloud server 4 (step S56), thereby completing the procedure.

In the image processing system 1 of the first preferred embodiment, the information processing terminal 3 and the image processing device 2 perform their respective processes described above. As a result, while connection is made between the information processing terminal 3 and the cloud server 4 and the in formation processing terminal 3 and the cloud server 4 communicate with each other directly, the connection is transferred to the image processing device 2 to shift to a condition where the image processing device 2 and the cloud server 4 communicate with each other directly. At this time, connection information required for logon to the cloud server 4 is transmitted automatically from the information processing terminal 3 to the image processing device 2. Thus, a user is not required to manually input identification information again such as user ID or a password having been input by the user for logon of the information processing terminal 3 to the cloud server 4, thereby achieving a high level of convenience.

After the connection to the cloud server 4 is transferred to the image processing device 2, the user operates a remote screen displayed on the information processing terminal 3. This can make the image processing device 2 and the cloud server 4 to work cooperatively to execute a job. If the user hopes to make the cloud server 4 automatically translate a document read by the scanner unit 6, or if the user hopes to make the printer unit 7 make a print output of data translated automatically by the cloud server 4, for example, the user can perform detailed setting operation on a remote screen substantially the same as an operational screen generally displayed on the operational panel 8 of the image processing device 2. Thus, the user is allowed to make the image processing device 2 reflect desirable detailed setting by remote control without operating the operational panel 8 directly. As an example, if the user hopes to make the printer unit 7 make a print output of data translated automatically by the cloud server 4, the user can check a print preview and the like of the data on a remote screen.

A remote screen not involving operation by the user is not displayed on the information processing terminal 3. This achieves a high level of usability of the user. When a job being executed by the cooperation of the image processing device 2 and the cloud server 4 is finished, the image processing device 2 may generate a remote screen informing the user of completion of the job and transmit the remote screen to the information processing terminal 3.

After the image processing device 2 and the cloud server 4 start to execute a job cooperatively, the job is not suspended but it is completed normally even if the user carrying the information processing terminal 3 moves to an environment that does not permit direct communication with the cloud server 4. This allows the user to move freely without caring for completion of a job that might take a long time.

As described above, the image processing system 1 of the first preferred embodiment enhances operability of a user remarkably when the user tries to execute a job by operating the information processing terminal 3 for connection to the cloud server 4 and by communicating with the cloud server 4.

Second Preferred Embodiment

A second preferred embodiment of the present invention is described next. The image processing device 2 of the second preferred embodiment is configured to execute multiple jobs successively and automatically based on a workflow specifying that these jobs are to be executed in a predetermined order. According to an exemplary aspect of the second preferred embodiment, while a user connects the information processing terminal 3 to the cloud server 4, the user downloads a particular file from the cloud server 4. Then, a workflow appropriate for processing file is presented to the user. If the user orders implementation of the workflow, the image processing device 2 and the cloud server 4 work cooperatively to execute jobs based on the workflow. The entire structure of the image processing system 1 of the second preferred embodiment is the same as that of the first preferred embodiment. The following describes differences of the image processing system 1 of the second preferred embodiment from that of the first preferred embodiment.

Figure 13:
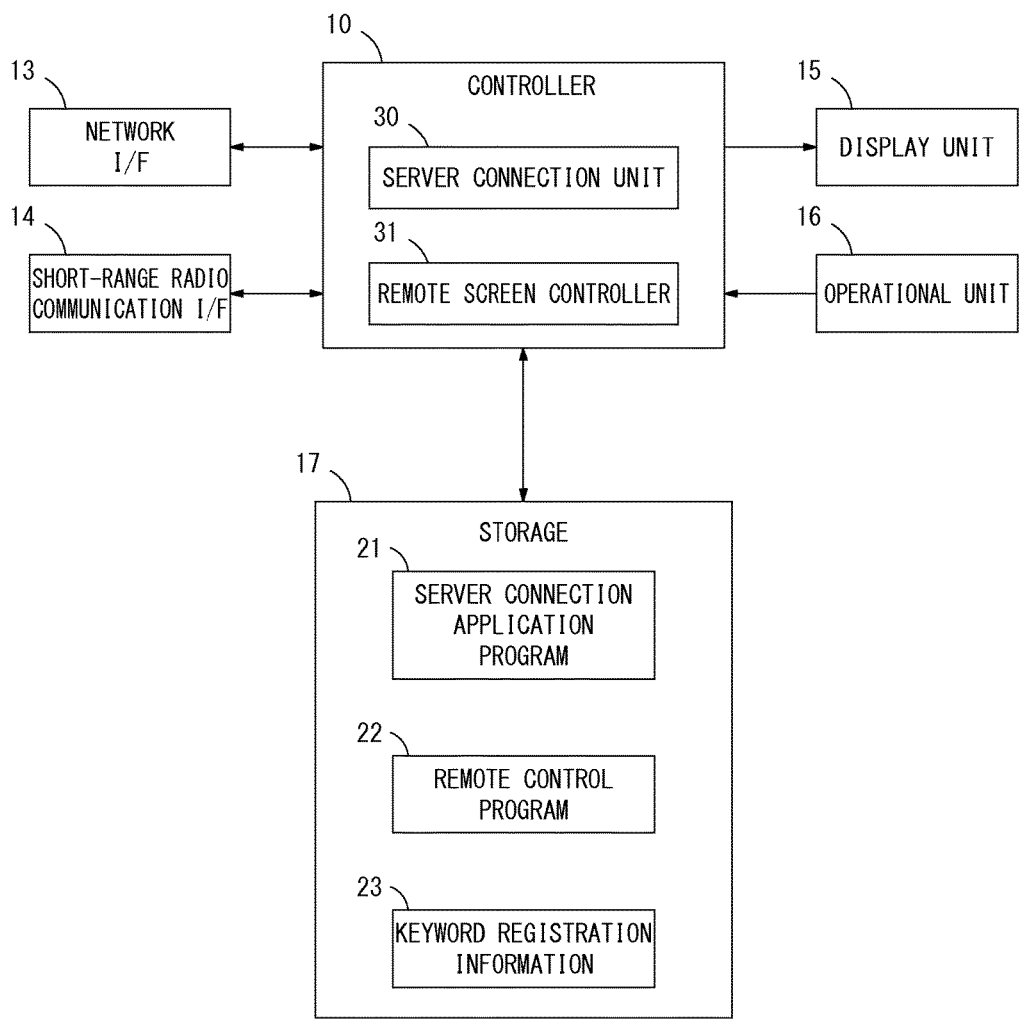
FIG. 13 shows an exemplary hardware structure and an exemplary functional structure of an information processing terminal of a second preferred embodiment.

FIG. 13 shows an exemplary hardware structure and an exemplary functional structure of the information processing terminal 3 of the second preferred embodiment. The information processing terminal 3 of FIG. 13 differs from that of FIG. 2 in that keyword registration information 23 is stored in advance in the storage 17. The keyword registration information 23 contains at least one keyword corresponding to a workflow that can be implemented by the image processing device 2. As an example, if the image processing device 2 can implement a workflow appropriate for processing a confidential document, the keyword registration information 23 contains a keyword "confidential."

In the information processing terminal 3 of the second preferred embodiment, if the server connecting unit 30 receives an operational screen or different information from the cloud server 4 while the server connecting unit 30 makes connection to the cloud server 4, the remote screen controller 31 analyzes the operational screen or the received information. If the operational screen or the received information contains a keyword registered with the keyword registration information 23, the remote screen controller 31 transmits the keyword to the image processing device 2. In doing so, the remote screen controller 31 queries the image processing device 2 as to whether the image processing device 2 can implement a workflow responsive to this keyword specifying that multiple jobs are to be executed in order. If a reply to the query is acquired on a remote screen from the image processing device 2, the remote screen controller 31 displays the remote screen on the display unit 15.

Figure 14:
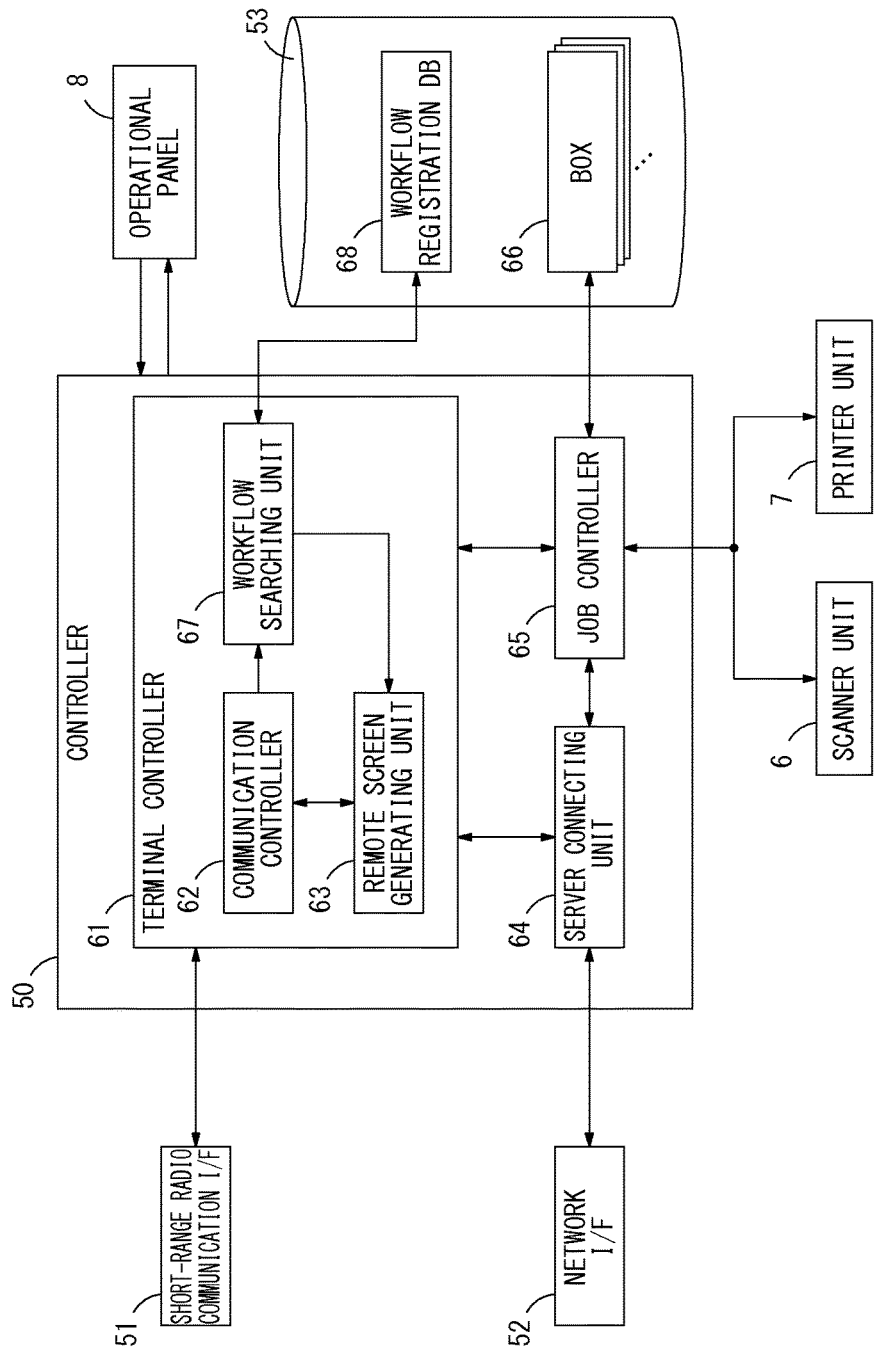
FIG. 14 shows an exemplary hardware structure and an exemplary functional structure of an image processing device of the second preferred embodiment.

FIG. 14 shows an exemplary hardware structure and an exemplary functional structure of the image processing device 2 of the second preferred embodiment. The image processing device 2 of FIG. 14 differs from that of FIG. 5 in that the storage 53 stores a workflow registration database 68 and that the terminal controller 61 further includes a workflow searching unit 67.

FIG. 15 shows an exemplary data structure of the workflow registration database 68. As shown in FIG. 15, the workflow registration database 68 stores multiple workflow data segments 68a, 68b, 68c and 68d. These workflow data segments 68a, 68b, 68c and 68d specify respective workflows. In each of the workflow data segments 68a, 68b, 68c and 68d, a keyword and multiple jobs to be executed in order based on the corresponding workflow are associated with each other. As an example, the workflow data segment 68a indicates a workflow corresponding to a keyword "confidential," and specifies four jobs to be executed in order based on this workflow. Specifically, the workflow corresponding to the keyword "confidential" specifies, as a first job, that each page of a file be given a watermark such as "Confidential." This workflow specifics, as a second job, that a password of this file be changed to a password at a given security level or higher. This workflow specifics, as a third job, that this file be stored into a BOX 66 for a confidential file. This workflow specifics, as a fourth job, that the BOX 66 storing the file and the newly changed password be transmitted to a user via electronic mail, for example. Accordingly, if the image processing device 2 implements the workflow corresponding to the keyword "confidential," these jobs specified by this workflow are executed in order.

If a keyword is received from the information processing terminal 3, the work flow searching unit 67 searches the workflow registration database 68 for a workflow corresponding to the received keyword. If the workflow searching unit 67 extracts the workflow, the remote screen generating unit 63 generates a remote screen on which multiple jobs in this workflow are displayed, and transmits the remote screen to the information processing terminal 3. This remote screen is displayed on the information processing terminal 3. This allows a user of the information processing terminal 3 to know that a file the user tries to download from the cloud server 4 is a confidential file, even if the user does not known the confidentiality of the file. This also allows the user to know the presence of a workflow to be implemented on this file. Then, the user designates a workflow on the remote screen displayed on the information processing terminal 3 and makes an order for cooperation for jobs. In response, like in the first preferred embodiment, the image processing device 2 and the cloud server 4 work cooperatively to execute the jobs while the image processing device 2 performs process based on the workflow designated by the user.

A workflow is not always composed of jobs to be executed by the image processing device 2. A workflow may contain a job to be executed by the cloud server 4. In this case, after the image processing device 2 and the cloud server 4 start to execute jobs cooperatively, each of the image processing device 2 and the cloud server 4 performs process based on a workflow designated by a user.

Figure 16:
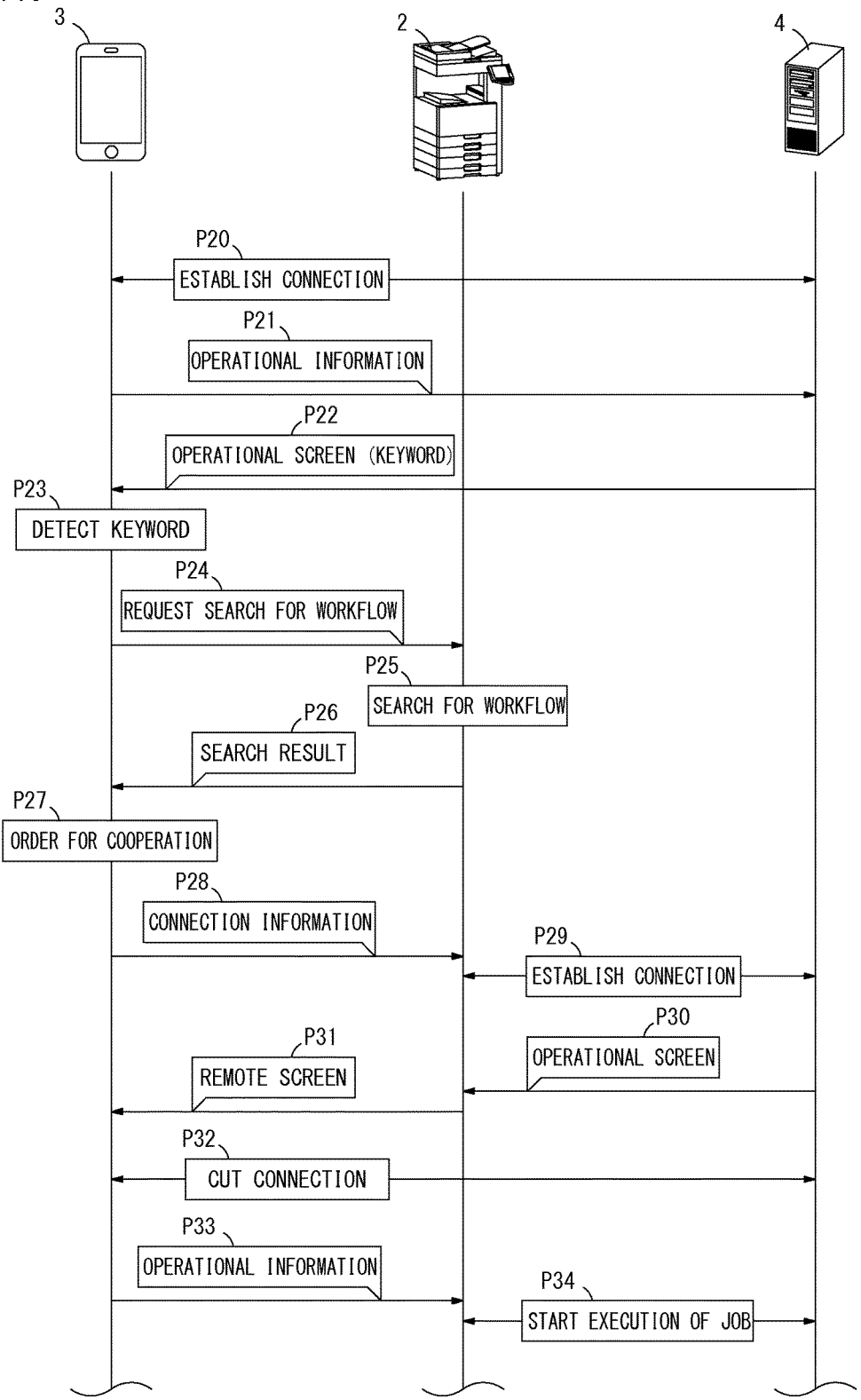
FIG. 16 shows an overview of an operation sequence in an image processing system of the second preferred embodiment.

FIG. 16 shows an overview of an operation sequence in the image processing system 1 of the second preferred embodiment. As shown in FIG. 16, the information processing terminal 3 and the cloud server 4 first become connected to each other (process P20). If a user performs operation on the information processing terminal 3 in this condition, operational information corresponding to the operation is transmitted to the cloud server (process P21). Then, an operational screen is transmitted from the cloud server 4 to the information processing terminal 3 (process P22). This operational screen contains various information and may contain the aforementioned keyword. The information processing terminal 3 analyzes the operational screen acquired from the cloud server 4.

If the information processing terminal 3 detects a keyword agreeing with a keyword registered with the keyword registration information 23 (process P23), the information processing terminal 3 transmits to the image processing device 2 a request for search for a workflow while attaching the keyword to the request (process P24). Based on the request, the image processing device 2 searches the workflow registration database 68 to extract a workflow corresponding to the keyword (process P25). In process P25, multiple workflows corresponding to the keyword may be extracted, or a workflow corresponding to the keyword may not be extracted. If extracting the workflow corresponding to the keyword, the image processing device 2 transmits a result of the search on a remote screen to the information processing terminal 3 (process P26).

The information processing terminal 3 displays the acquired remote screen indicating a result of the search by the image processing device 2. If the user designates a workflow and makes an order for cooperation for jobs (process P27), the information processing terminal 3 transmits connection information to the image processing device 2 used to make connection to the cloud server 4 (process P28). The image processing device 2 establishes connection to the cloud server 4 based on the connection information (process P29). The connection established at this time is the same as the connection established between the information processing terminal 3 and the cloud server 4. After establishing the connection to the cloud server 4, the image processing device 2 acquires from the cloud server 4 an operational screen same as that displayed on the information processing terminal 3 (process P30). Then, the image processing device 2 generates a remote screen and transmits the remote screen to the information processing terminal 3 (process P31). The remote screen is displayed on the information processing terminal 3. Then, in response to an order for cutting received from the image processing device 2, the information processing terminal 3 cuts the connection to the cloud server 4 (process P32). If the user performs operation on the remote screen thereafter, operational information corresponding to the operation is transmitted to the image processing device 2 (process 33). If the operational information transmitted at this time is one that orders the image processing device 2 or the cloud server 4 to start execution of jobs based on a workflow, the image processing device 2 and the cloud server 4 start to execute the jobs cooperatively (process P34).

The following describes respective procedures of processes in detail performed by the information processing terminal 3 and the image processing device 2 in the second preferred embodiment.

Figure 17:
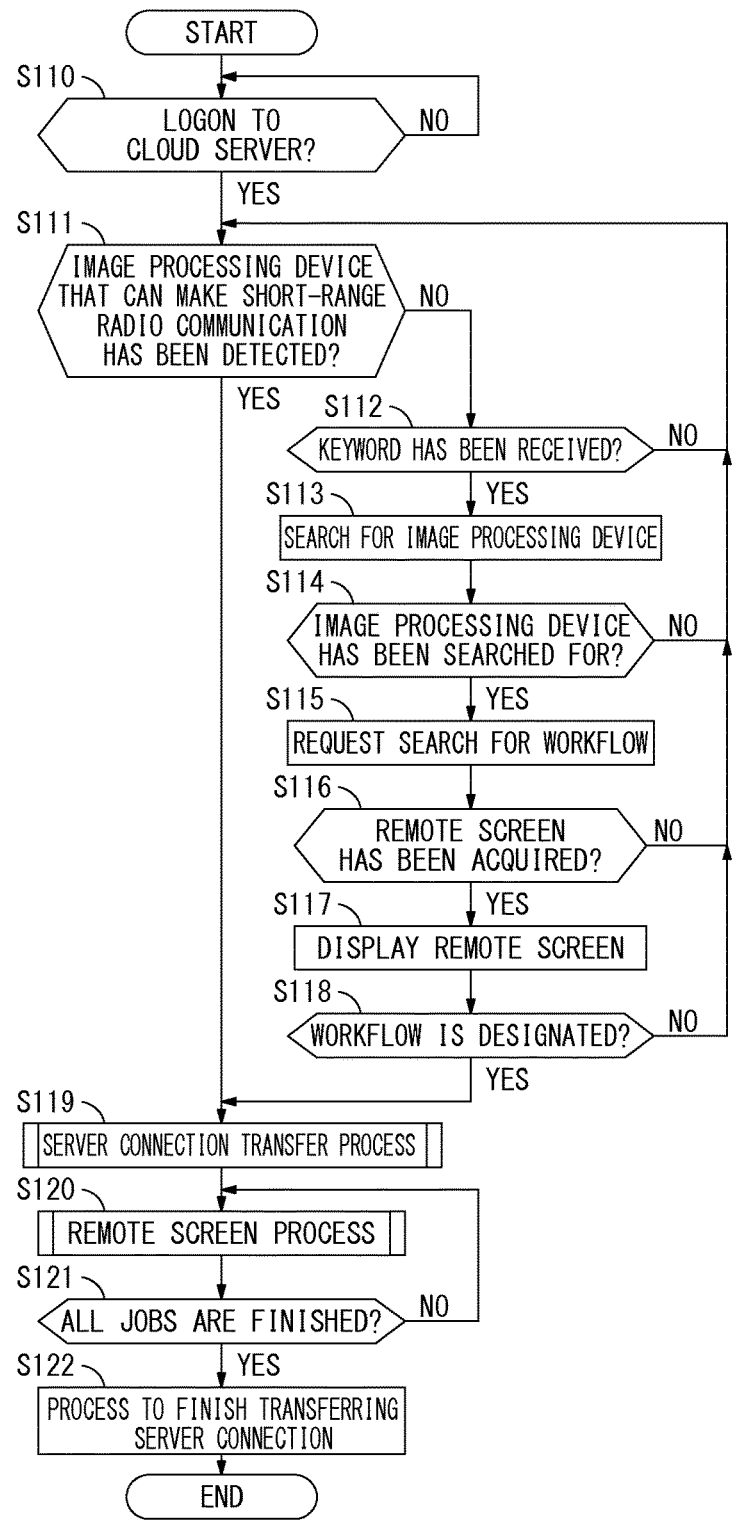
FIG. 17 is a flowchart explaining an example of detailed procedure of process performed by the information processing terminal of the second preferred embodiment.

FIG. 17 is a flowchart explaining an example of detailed procedure of the process performed by the information processing terminal 3 of the second preferred embodiment. This process is mainly performed by the remote screen controller 31 of the information processing terminal 3. When this process is started, the server connecting unit 30 is actuated in the controller 10 and the remote screen controller 31 is placed in standby until the server connecting unit 30 logs onto the cloud server 4 (step S110). If the server connecting unit 30 logs onto the cloud server 4 (YES of step S110), the remote screen controller 31 determines whether the image processing device 2 has been detected that can make short-range radio communication (step S111). If the image processing device 2 has been detected that can make short-range radio communication (YES of step S111), the flow proceeds to step S119.

If the image processing device 2 has not been detected that can make short-range radio communication (NO of step S111), the remote screen controller 31 determines whether a keyword agreeing with a keyword registered with the keyword registration information 23 is contained for example in an operational screen acquired by the server connecting unit 30 from the cloud server 4 (step S112). If a keyword agreeing with a registered keyword has not been received (NO of step S112), the flow returns to step S111.

If a keyword agreeing with a registered keyword has been received (YES of step S112), the remote screen controller 31 searches for the image processing device 2 that can communicate with the information processing terminal 3 (step S113). Here, as an example, the remote screen controller 31 searches for the image processing device 2 that can communicate with the information processing terminal 3 through the short-range radio communication interface 14. The remote screen controller 31 further searches for the image processing device 2 that can communicate with the information processing terminal 3 through the network interface 13. If the image processing device 2 that can communicate with the information processing terminal 3 is extracted (YES of step S114), the remote screen controller 31 transmits to this image processing device 2 a request for search for a workflow corresponding to the keyword (step S115). If a remote screen indicating a result of the search is acquired thereafter from the image processing device 2 (YES of step S116), the remote screen controller 31 displays the remote screen on the display unit 15. Then, if a user designates a workflow and makes an order for cooperation (YES of step S118), the flow proceeds to step S119. If the image processing device 2 that can communicate with the information processing terminal 3 is not extracted (NO of step S114), if a remote screen is not received from the image processing device 2 (NO of step S116) after transmission of the request for search for a workflow, and if the user does not make an order for cooperation (NO of step S118), the flow returns to step S111.

After the flow proceeds to step S119, it follows the same process as that of the first preferred embodiment. Specifically, steps S119 to S122 are the same as steps S15 to S18 of FIG. 7 respectively. If the user designates the workflow and makes an order for cooperation, connection of the information processing terminal 3 to the cloud server 4 is transferred to the image processing device 2, and then the image processing device 2 and the cloud server 4 work cooperatively to execute multiple jobs in order specified by the workflow designated by the user.

Figure 18:
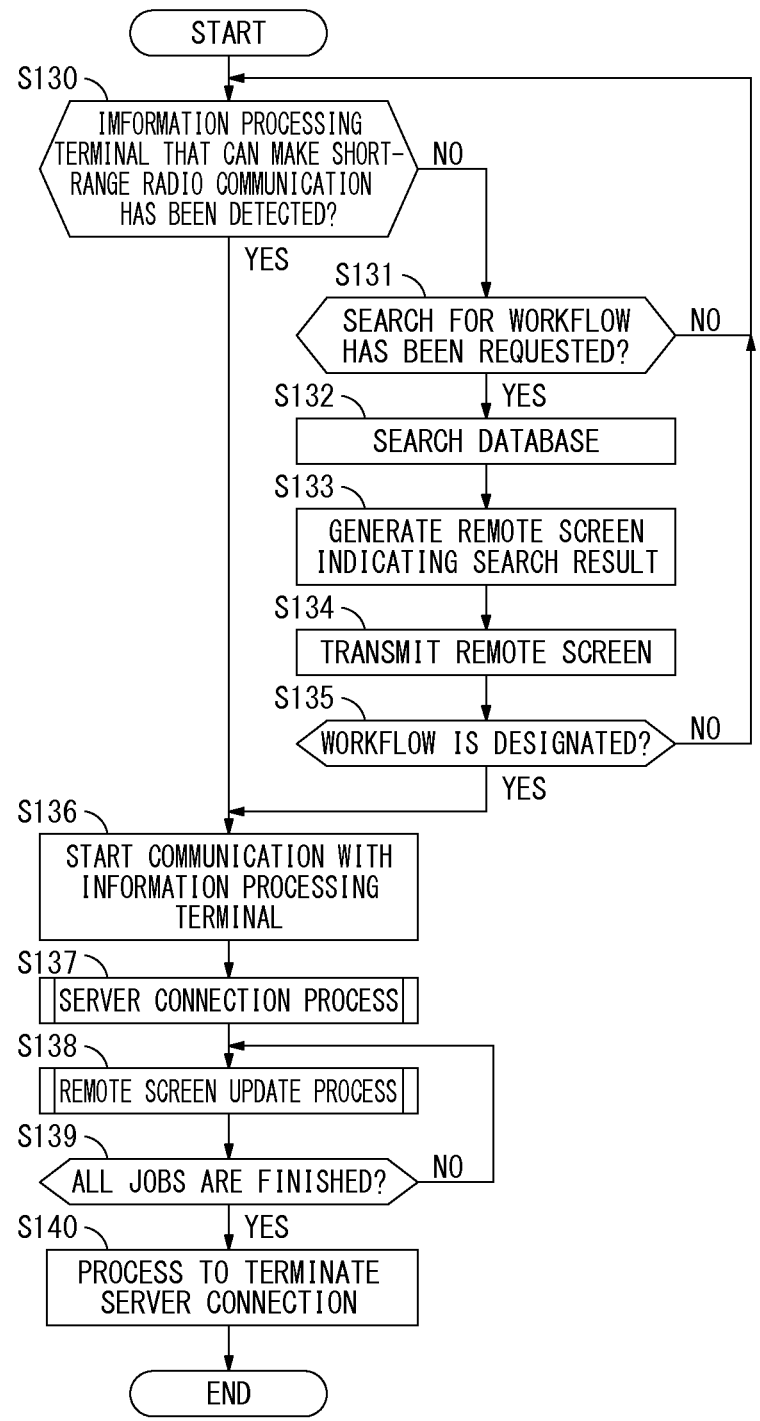
FIG. 18 is a flowchart explaining an example of detailed procedure of process performed by the image processing device of the second preferred embodiment.

FIG. 18 is a flowchart explaining an example of detailed procedure of the process performed by the image processing device 2 of the second preferred embodiment. This process is mainly performed by the terminal controller 61 (communication controller 62 and remote screen generating unit 63) of the image processing device 2. When this process is started, the terminal controller 61 determines whether the information processing terminal 3 has been detected that can make short-range radio communication (step S130). If the information processing terminal 3 has been detected that can make short-range radio communication (YES of step S130), the flow proceeds to step S136. If the information processing terminal 3 has not been detected that can make short-range radio communication (NO of step S136), the terminal controller 61 further determines whether a request for search for a workflow has been received from the information processing terminal 3 (step S131). If the request for search has not been received, the flow returns to step S130.

Meanwhile, if the request for search for a workflow has been received (YES of step S131), the terminal controller 61 searches the workflow registration database 68 for a workflow based on a keyword attached to the request for search (step S132). If a workflow corresponding to the keyword is extracted, the terminal controller 61 generates a remote screen indicating a result of the search (step S133), and transmits the remote screen to the information processing terminal 3 (step S134). If information about making an order for cooperation designating a workflow is received thereafter from the information processing terminal 3 (YES of step S135), the flow proceeds to step S136. If information about making an order for cooperation is not received, the flow returns to step S130.

After the flow proceeds to step S136, it follows the same process as that of the first preferred embodiment. Specifically, steps S136 to S140 are the same as steps S52 to S56 of FIG. 10 respectively. If a user designates the workflow and makes an order for cooperation, the image processing device 2 takes over connection to the cloud server 4 having been established between the information processing terminal 3 and the cloud server 4, and then executes multiple jobs in order specified by the workflow designated by the user in cooperation with the cloud server 4.

In the image processing system 1 of the second preferred embodiment, the information processing terminal 3 and the image processing device 2 perform their respective processes described above. As a result, if a user tries to perform particular process while connection is made between the information processing terminal 3 and the cloud server 4, the user is automatically informed of the fact that a workflow appropriate for this process can be implemented by the image processing device 2. Thus, even if the user does not know the presence of such a workflow, the user has only to designate a workflow announced to the user. Then, multiple jobs specified by the workflow can be executed in order while the user makes the image processing device 2 and the cloud server 4 work cooperatively by making the image processing device 2 take over connection between the information processing terminal 3 and the cloud server 4. If the user knows the presence of a workflow, the user is not required to search for a workflow manually appropriate for particular process the user tries to perform and designate such a workflow. As a result, the image processing system 1 of the second preferred embodiment advantageously simplifies user's operation involving designating a workflow that specifies multiple jobs to be executed in order while the information processing terminal 3 and the cloud server 4 are connected to each other, and implementing the workflow. The second preferred embodiment achieves the same advantages in other respects as the first preferred embodiment.

According to the invention disclosed in each of the aforementioned preferred embodiments, while connection is made between an information processing terminal and a cloud server and the information processing terminal and the cloud server communicate with each other directly, the connection can be transferred to an image processing device easily. After the connection is transferred to the image processing device, the image processing device and the cloud server can work cooperatively to execute a job in response to remote control of the image processing device from the information processing terminal.

(Modifications)

The present invention is not limited to the preferred embodiments described above but is applicable to various modifications. Some of the modifications are described below.

In the examples of the aforementioned preferred embodiments, the image processing device 2 is composed of a device such as an MFP having multiple functions including a scanning function, a printing function, and a BOX function. However, the image processing device of the present invention is not limited to a device such as an MFP having multiple functions.

In the example of the second preferred embodiment, if the information processing terminal 3 receives a keyword from the cloud server 4, the information processing terminal 3 queries the image processing device 2 as to a workflow corresponding to the keyword. As another example, a keyword transmitted from the cloud server 4 to the information processing terminal 3 may be used to search for the image processing device 2 that can implement a workflow corresponding to the keyword. While a user stays out, the user may hope to execute a series of jobs based on a particular workflow using the image processing device 2 placed for example in the nearest convenience store. In this case, the image processing device 2 nearest the user may be searched for based on positional information received by the cloud server 4 from the information processing terminal 3 and the user may be informed of the place of the image processing device 2. This achieves a higher level of convenience.

What is claimed is:

1. An image processing device capable of communicating with an information processing terminal and a cloud server, wherein said information processing terminal establishes connection with said cloud server to receive an operational screen about a job from said cloud server in order to allow the information processing terminal and said cloud server to execute the job cooperatively, the image processing device comprising:
   a hardware processor configured to:
      communicate with said information processing terminal to receive connection information from said information processing terminal;
      make a connection to said cloud server, the connection enabled by said connection information that has been input by a user to the information processing terminal, and the hardware processor acquiring an operational screen from said cloud server, said operational screen acquired being a similar screen as said operational screen displayed on said information processing terminal in order to allow the image processing device and said cloud server to cooperatively and continuously execute the job that has been executed cooperatively by the information processing terminal and said cloud server;
      generate a remote screen based on said operational screen acquired by the hardware processor from said cloud server and transmit the remote screen to said information processing terminal, the remote screen being used for remote control from said information processing terminal; and
      execute, when operational information received by said hardware processor is an order made on said remote screen to execute the job, the job in cooperation with said cloud server.

2. The image processing device according to claim 1, wherein when said information processing terminal is detected that can make short-range radio communication or when a request for said remote screen is received from said information processing terminal, hardware processor communicates with said information processing terminal and acquires said connection information.

3. The image processing device according to claim 1, wherein when said operational information received by said hardware processor indicates setting operation on a job involving said hardware processor, said hardware processor generates a remote screen based on a detailed setting screen reflecting the setting operation on the job, and transmits the remote screen to said information processing terminal.

4. The image processing device according to claim 1, wherein in response to acquisition of an operational screen by said hardware processor from said cloud server, said hardware processor transmits an order to said information processing terminal causing said information processing terminal to cut connection to said cloud server, the operational screen being the same as an operational screen about a job displayed on said information processing terminal.

5. The image processing device according to claim 1, wherein in response to start execution of a job by cooperation of said hardware processor and said cloud server, said hardware processor cuts communication with said information processing terminal.

6. The image processing device according to claim 5, wherein in response to update of said remote screen by said hardware processor after cutting of communication with said information processing terminal, said hardware processor establishes communication with said information processing terminal again and transmits said remote screen updated by said hardware processor to said information processing terminal.

7. The image processing device according to claim 6, wherein when an operational screen newly acquired by said hardware processor from said cloud server involves operation by the user of said information processing terminal, said hardware processor updates said remote screen based on the newly acquired operational screen.

8. The image processing device according to claim 1, wherein said hardware processor is further configured to search a database storing a registered workflow according to which multiple jobs are to be executed in order in association with a keyword, wherein
   when said hardware processor receives a keyword, hardware processor searches said database to extract a workflow corresponding to the keyword,
   in response to extraction of a workflow by said hardware processor, said hardware processor generates a remote screen on which multiple jobs in this workflow are displayed, and transmits the remote screen to said information processing terminal, and
   when operational information received by said hardware processor is an order to implement said workflow displayed on said remote screen, said hardware processor executes multiple jobs in said workflow in order in cooperation with said cloud server.

9. The image processing device according to claim 1, wherein said hardware processor communicates with said information processing terminal to acquire said connection information when said information processing terminal is detected that can make short-range radio communication.

10. An information processing terminal capable of communicating with an image processing device and a cloud server, the information processing terminal comprising:
    a display to present various information;
    an input device to detect various operations by a user;
    a hardware processor configured to:
       make connection to said cloud server based on an operation detected by said input device in order to allow the information processing terminal and said cloud server to execute a job cooperatively, acquire an operational screen about the job from said cloud server, and display the operational screen on said display in order to allow the image processing device and said cloud server to cooperatively and continuously execute the job that has been executed cooperatively by the information processing terminal and said cloud server;
       transmit connection information to said image processing device while said hardware processor connects to said cloud server, said connection information enabling said image processing device to connect to said cloud server;

acquire from said image processing device a remote screen generated by said image processing device after said imago processing device has connected to said cloud server to receive an operational screen similar to the operational screen displayed on the information processing terminal;

switch a screen on said display from said operational screen to tho remote screen corresponding to said operational screen about said job; and transmit operational information to said image processing device in response to detection of operation on said remote screen, said operational information causing said image processing device to execute said job.

11. The information processing terminal according to claim 10, wherein, while said hardware processor makes connection to said cloud server, when said image processing device is detected that can make short-range radio communication or when said input device detects operation by said user requesting a remote screen, said hardware processor communicates with said image processing device and transmits said connection information.

12. The information processing terminal according to claim 10, wherein said hardware processor cuts connection to said cloud server based on an order received by said hardware processor from said image processing device.

13. The information processing terminal according to claim 10, wherein said hardware processor cuts communication with said image processing device after transmitting operational information to said image processing device.

14. The information processing terminal according to claim 13, wherein after cutting communication with said image processing device, said hardware processor establishes communication with said image processing device again based on a request from said image processing device, acquires an updated remote screen from said image processing device, and displays said updated remote screen on said display.

15. The information processing terminal according to claim 10, wherein when said hardware processor receives a certain keyword from said cloud server, said hardware processor transmits the keyword to said image processing device, thereby querying said image processing device as to whether said image processing device can implement a workflow corresponding to the keyword and specifying that multiple jobs are to be executed in order.

16. The Information processing terminal according to claim 10, wherein said hardware processor transmits said connection information to said information device when said image processing device is detected that can make short-range radio communication.

17. A non-transitory computer-readable recording medium storing a program to be executed by an information processing terminal capable of communicating with an image processing device and a cloud server, the information processing terminal including a display to present various information and an input device to detect various operations by a user, wherein while said information processing terminal makes connection to said cloud server based on an operation detected by said input device to acquire an operational screen about a job from said cloud server in order to allow the information processing terminal and said cloud server to execute the job cooperatively and display said operational screen on said display, said program is executed by said information processing terminal to make said information processing terminal function as a remote screen controller in order to allow the image processing device and said cloud server to cooperatively and continuously execute the job that has been executed cooperatively by the information processing terminal and said cloud server, the remote screen controller requesting a remote screen by
transmitting connection information to said image processing device, said connection information enabling said image processing device to connect to said cloud server, acquiring from said image processing device a remote screen generated by said image processing device after said image processing device has connected to said cloud server to receive an operational screen similar to the operational screen displayed on the information processing terminal, switching a screen on said display of said information processing terminal from said operational screen to the remote screen corresponding to said operational screen about said job, and transmitting operational information to said image processing device in response to detection of operation on said remote screen detected by said input device, said operational information causing said image processing device to execute said job.

18. The non-transitory computer readable medium according to claim 17, wherein said remote screen controller transmits said connection information to said image processing device when said image processing device is detected that can make short-range radio communication.

19. A non-transitory computer-readable recording medium storing a program to be executed by an image processing device capable of communicating with an information processing terminal and a cloud server, wherein said information processing terminal establishes connection with said cloud server to receive an operational screen about a job from said cloud server in order to allow said information processing terminal and said cloud server to execute the job cooperatively, execution of said program by said image processing device making said image processing device function as a system comprising:

a hardware processor configured to:

communicate with said information processing terminal to receive connection information from said information processing terminal;

make a connection to said cloud server, the connection enabled by said connection information that has been input by a user to the information processing terminal, and the hardware processor acquiring an operational screen from said cloud server, said operational screen acquired being a similar screen as said operational screen displayed on said information processing terminal in order to allow the image processing device and said cloud server to cooperatively and continuously execute the job that has been executed cooperatively by the information processing terminal and said cloud server;

generate a remote screen based on said operational screen acquired by the hardware processor from said cloud server and transmit the remote screen to said information processing terminal, the remote screen being used for remote control from said information processing terminal; and execute, when operational information received by said hardware processor is an order made on said remote screen to execute the job, the job in cooperation with said cloud server.

20. The non-transitory computer readable medium according to claim 19, wherein said hardware processor communicates with said information processing terminal to acquire said connection information when said information processing terminal is detected that can make short-range radio communication.

* * * * *